United States Patent [19]
Nadeau

[11] Patent Number: 5,306,165
[45] Date of Patent: Apr. 26, 1994

[54] ELECTRIC DISTRIBUTING SYSTEM

[76] Inventor: Jacques Nadeau, 940 boulevard St-Joseph West, Drummondville, Quebec, Canada, J2E 1H9

[21] Appl. No.: 9,925

[22] Filed: Jan. 27, 1993

[51] Int. Cl.$^5$ .............................................. H01R 25/14
[52] U.S. Cl. .................................... 439/115; 439/120; 439/218
[58] Field of Search ............................. 439/110–122, 439/215, 189, 218

[56] References Cited

U.S. PATENT DOCUMENTS

| | | | |
|---|---|---|---|
| 3,081,442 | 3/1963 | Platz | 439/118 |
| 3,836,936 | 9/1974 | Clement | 439/116 |
| 4,089,578 | 5/1978 | Valtonen | 439/115 |
| 4,293,172 | 10/1981 | Lingaraju | 439/652 |
| 4,679,884 | 7/1987 | Klemp | 439/622 |

FOREIGN PATENT DOCUMENTS

| | | |
|---|---|---|
| 581032 | 8/1959 | Canada . |
| 615388 | 2/1961 | Canada . |
| 627996 | 9/1961 | Canada . |
| 633643 | 12/1961 | Canada . |
| 635022 | 1/1962 | Canada . |
| 644404 | 7/1962 | Canada . |
| 649959 | 10/1962 | Canada . |
| 655058 | 1/1963 | Canada . |
| 668901 | 8/1963 | Canada . |
| 676526 | 12/1963 | Canada . |

Primary Examiner—Gary F. Paumen
Attorney, Agent, or Firm—Oblon, Spivak, McClelland, Maier & Neustadt

[57] ABSTRACT

An electrical distribution system comprising one or more tracks having current-carrying conductors and ground conductor for mounting on wall surfaces. The tracks are slidingly received in connecting slots of electrical connector housings to connect the tracks to electrical outlets, or to interconnect sections of tracks together. More particularly, with the present invention it is not necessary to strip the ends of the tracks to expose connector ends to interconnect them with terminals in the connector housings. An end portion of the track is merely slid within a connecting slot of the housing. Electrical receptacles are also connected at any desired location along the track. The electrical distribution track can also be incorporated in an extruded baseboard together with a telephone line track to permit connection thereto of electrical receptacles as well as alarm systems, telephone jacks, fire detectors, surge protectors, etc.

52 Claims, 12 Drawing Sheets

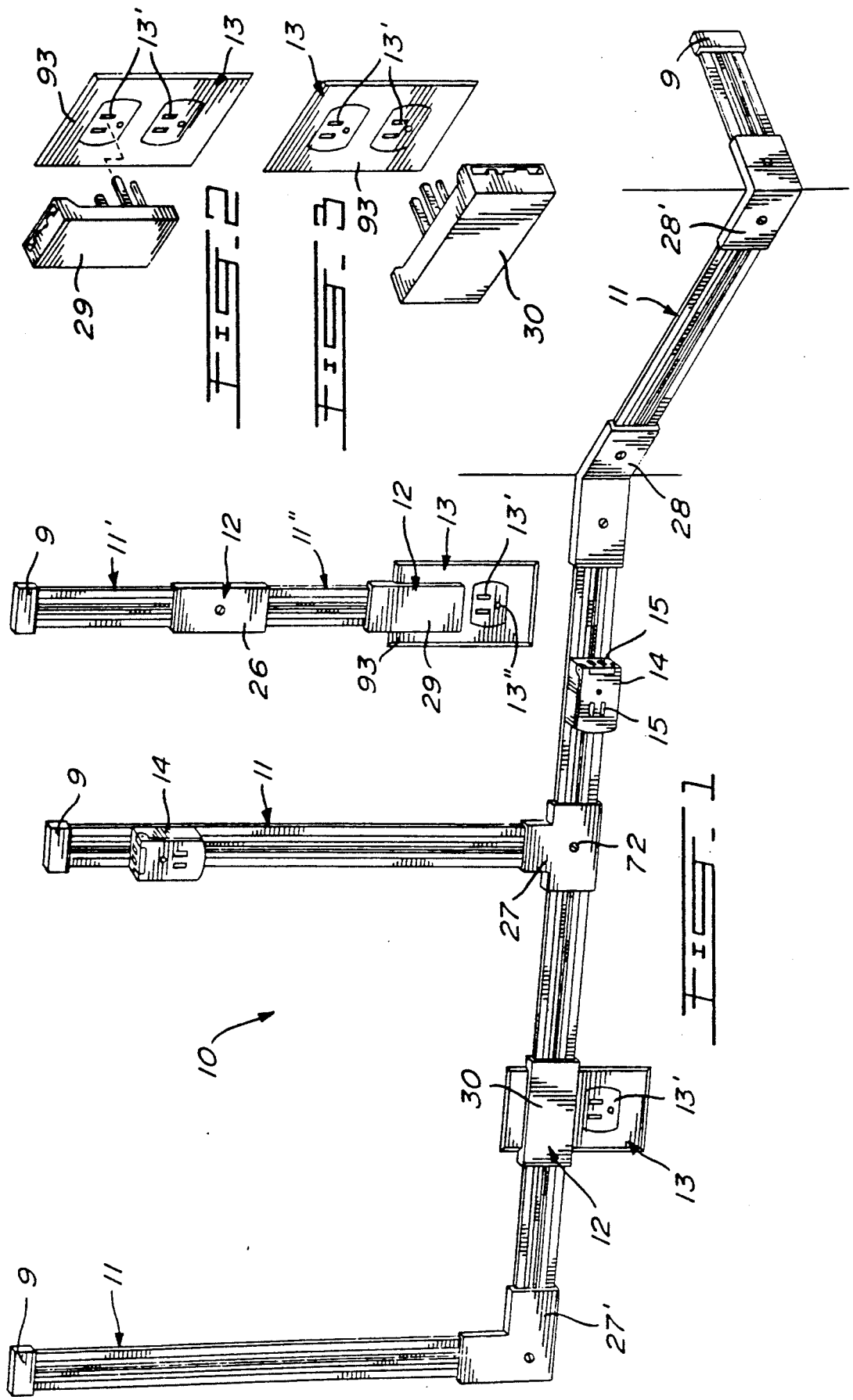

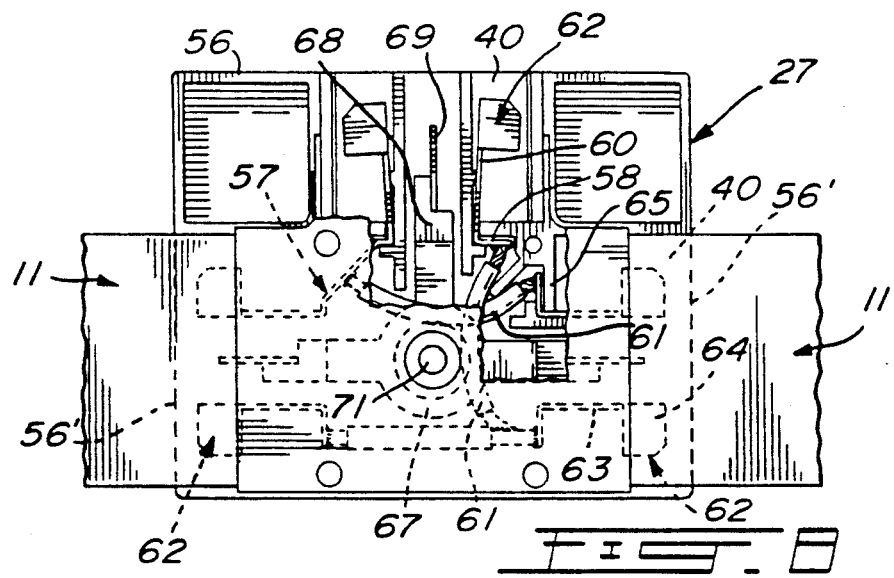
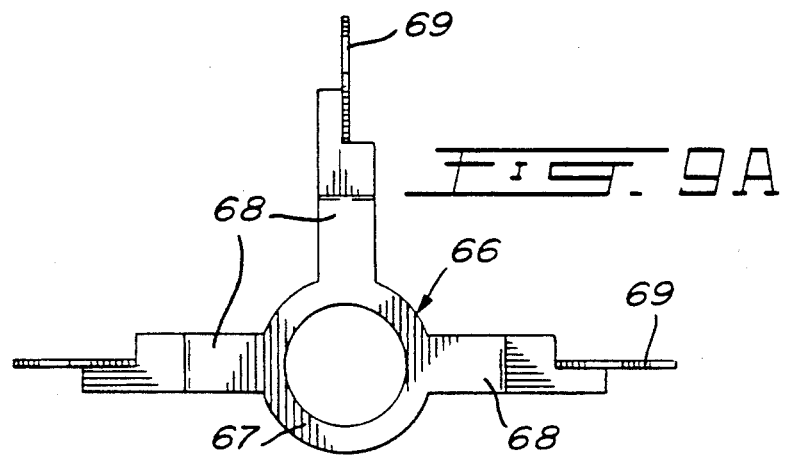
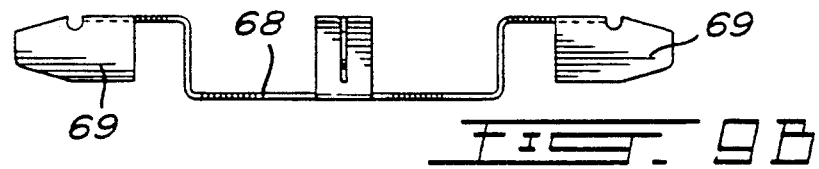
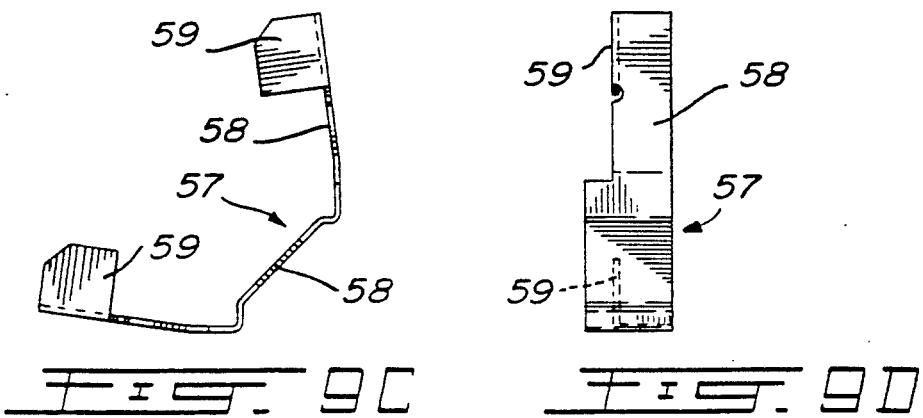

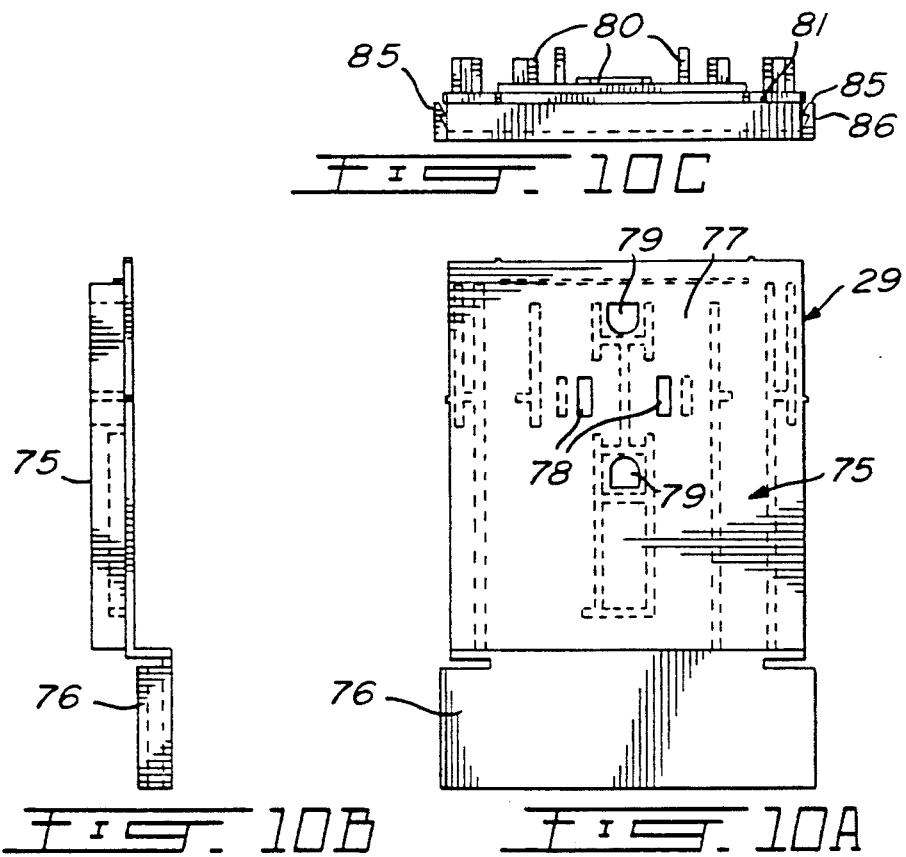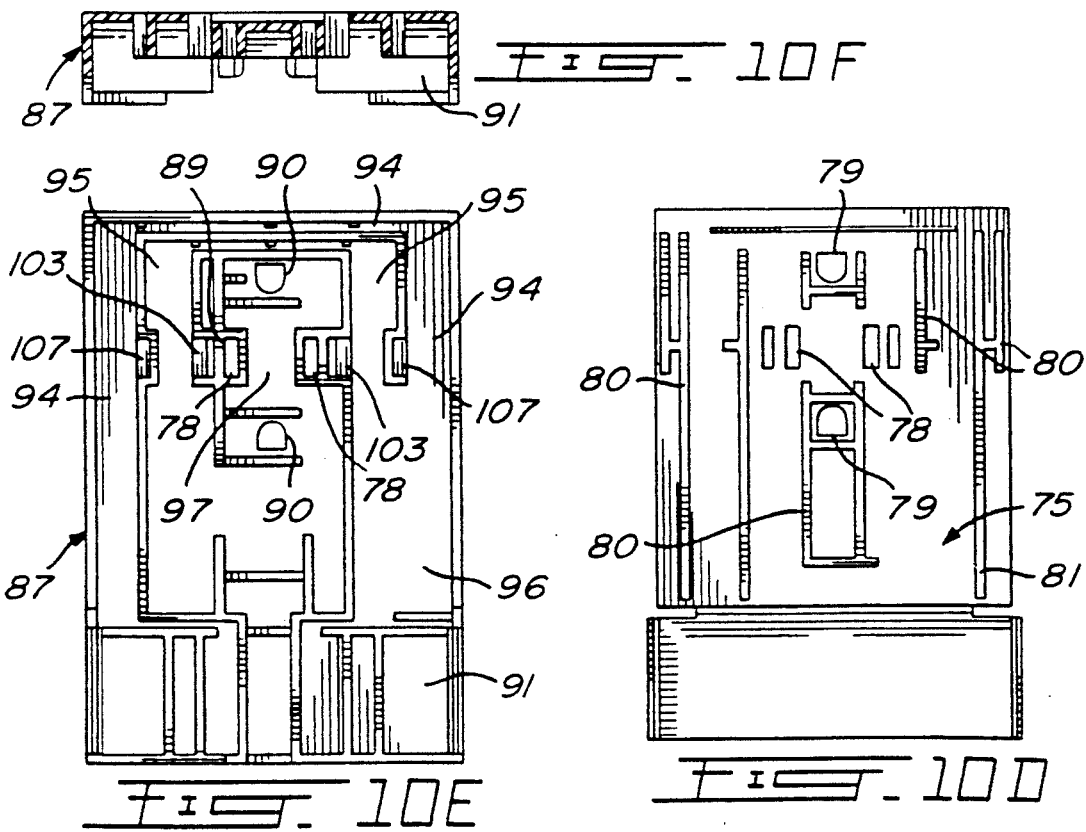

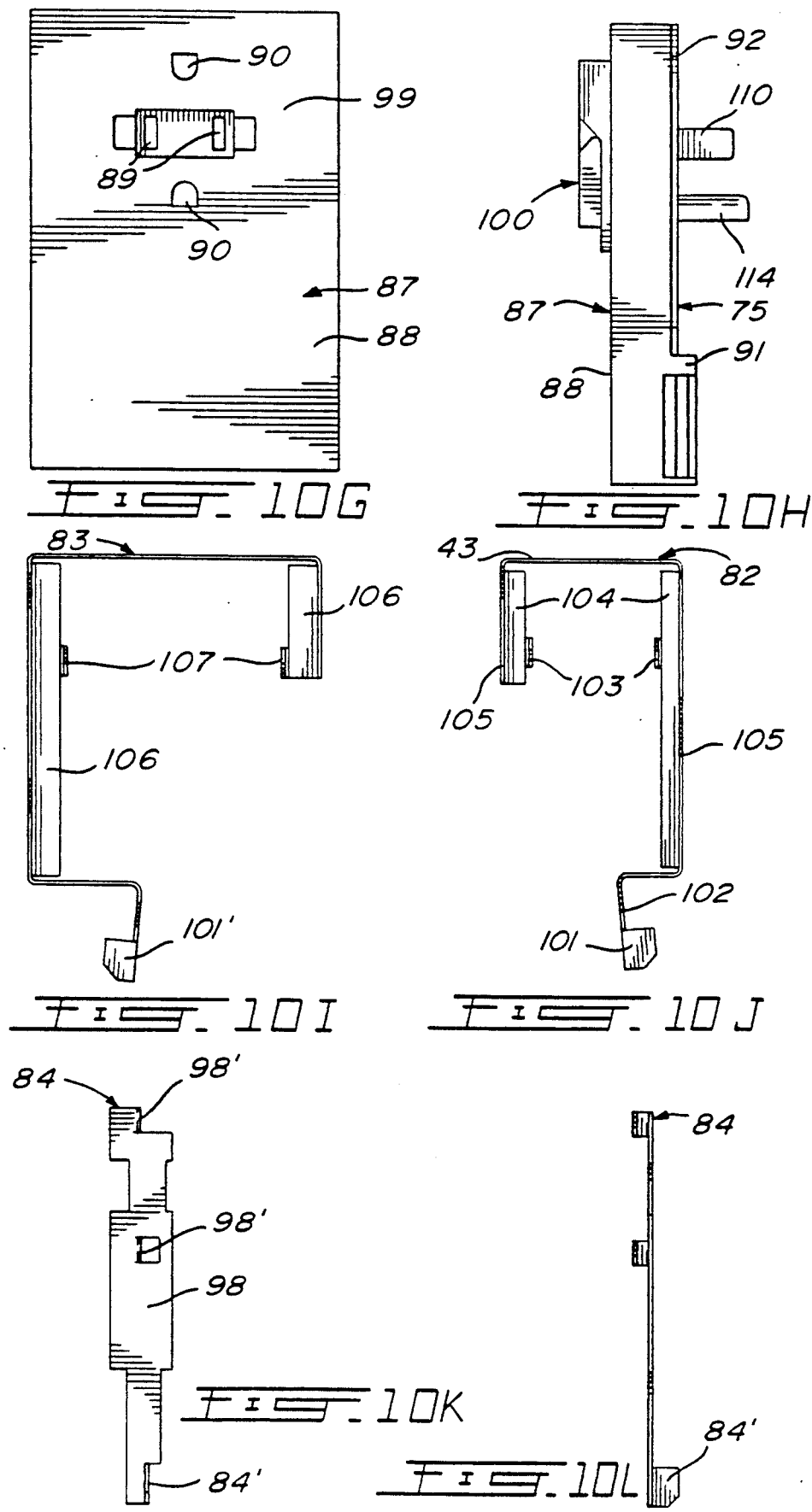

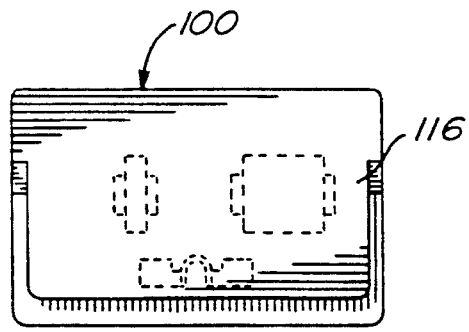
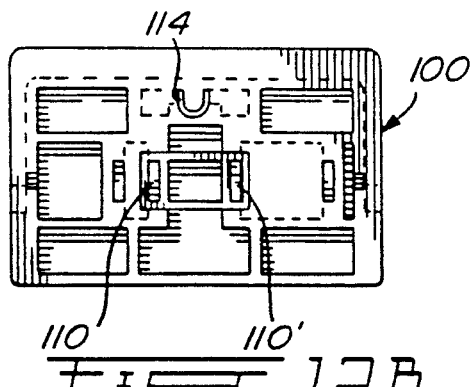
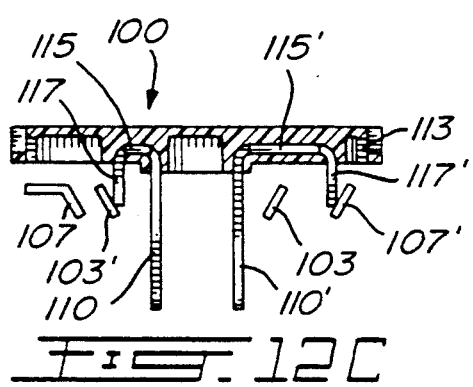
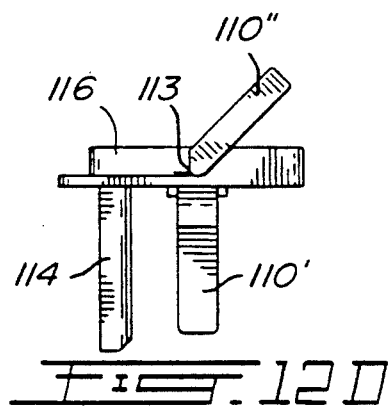
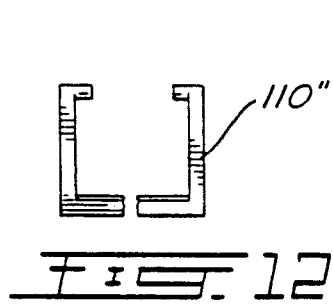
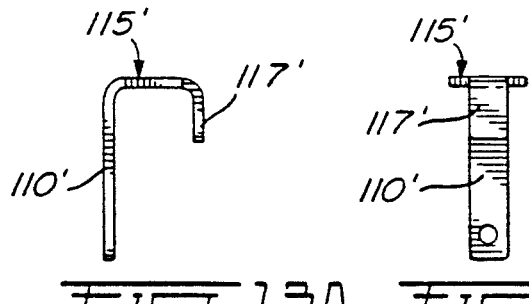
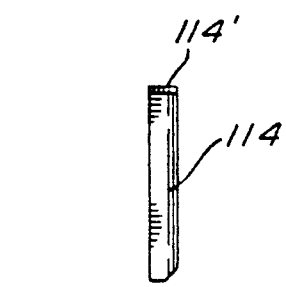
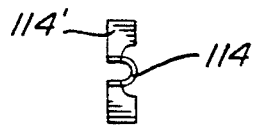

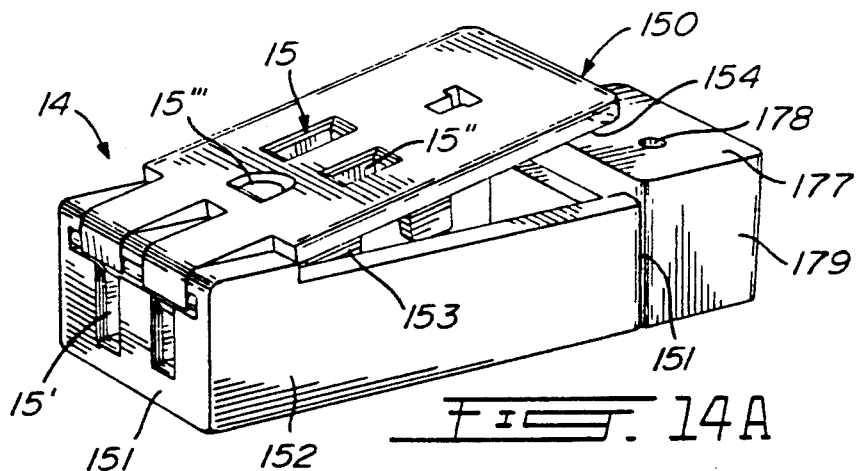
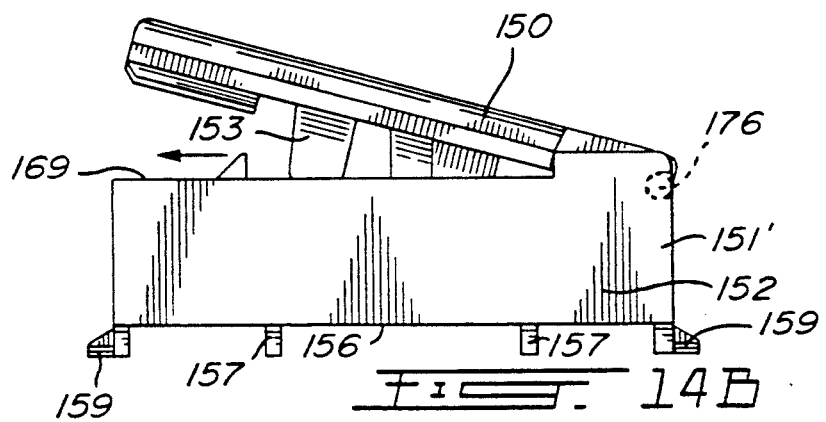
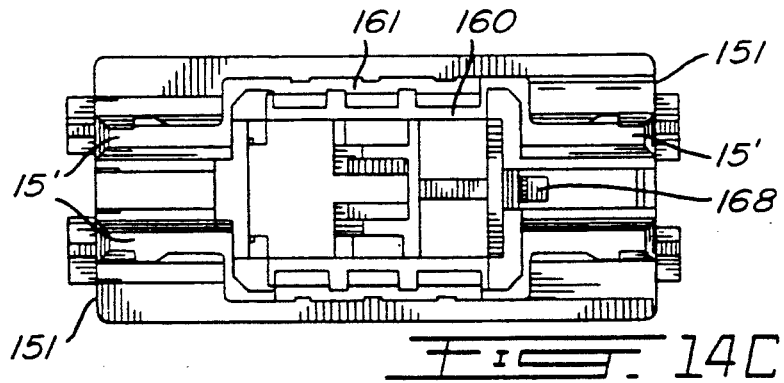
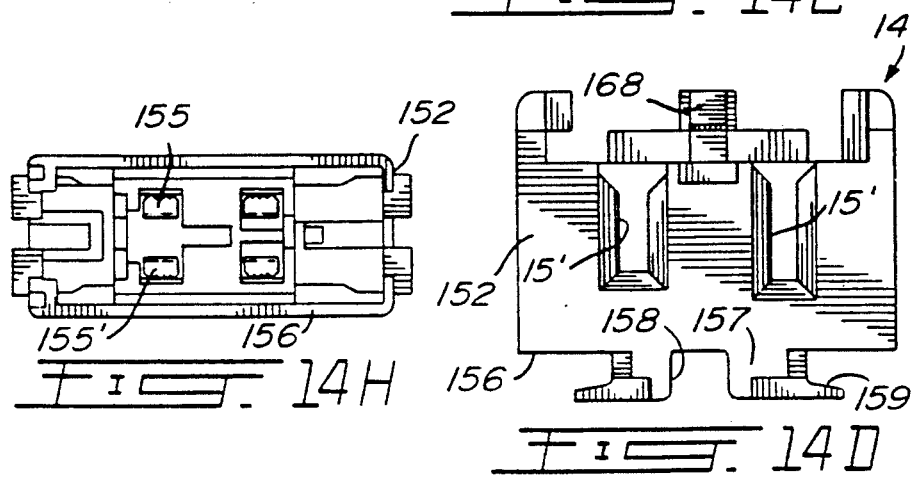

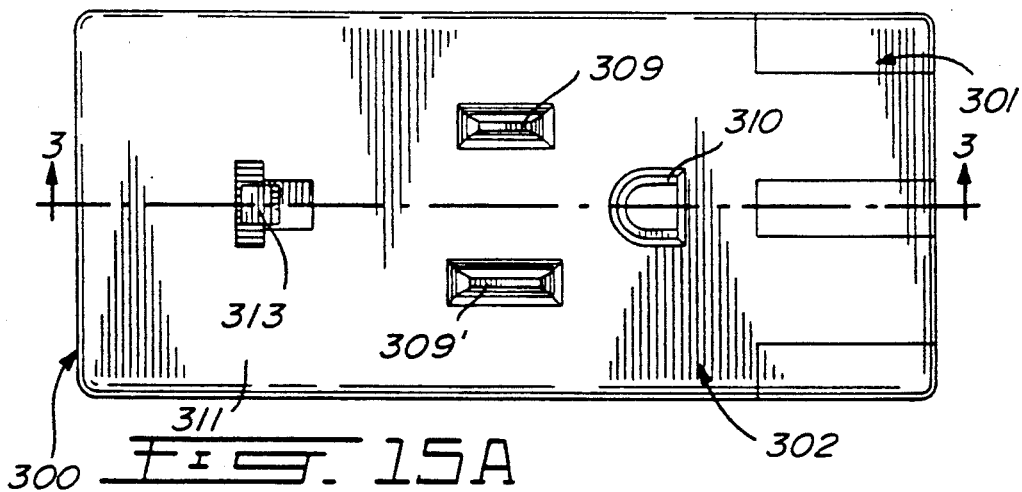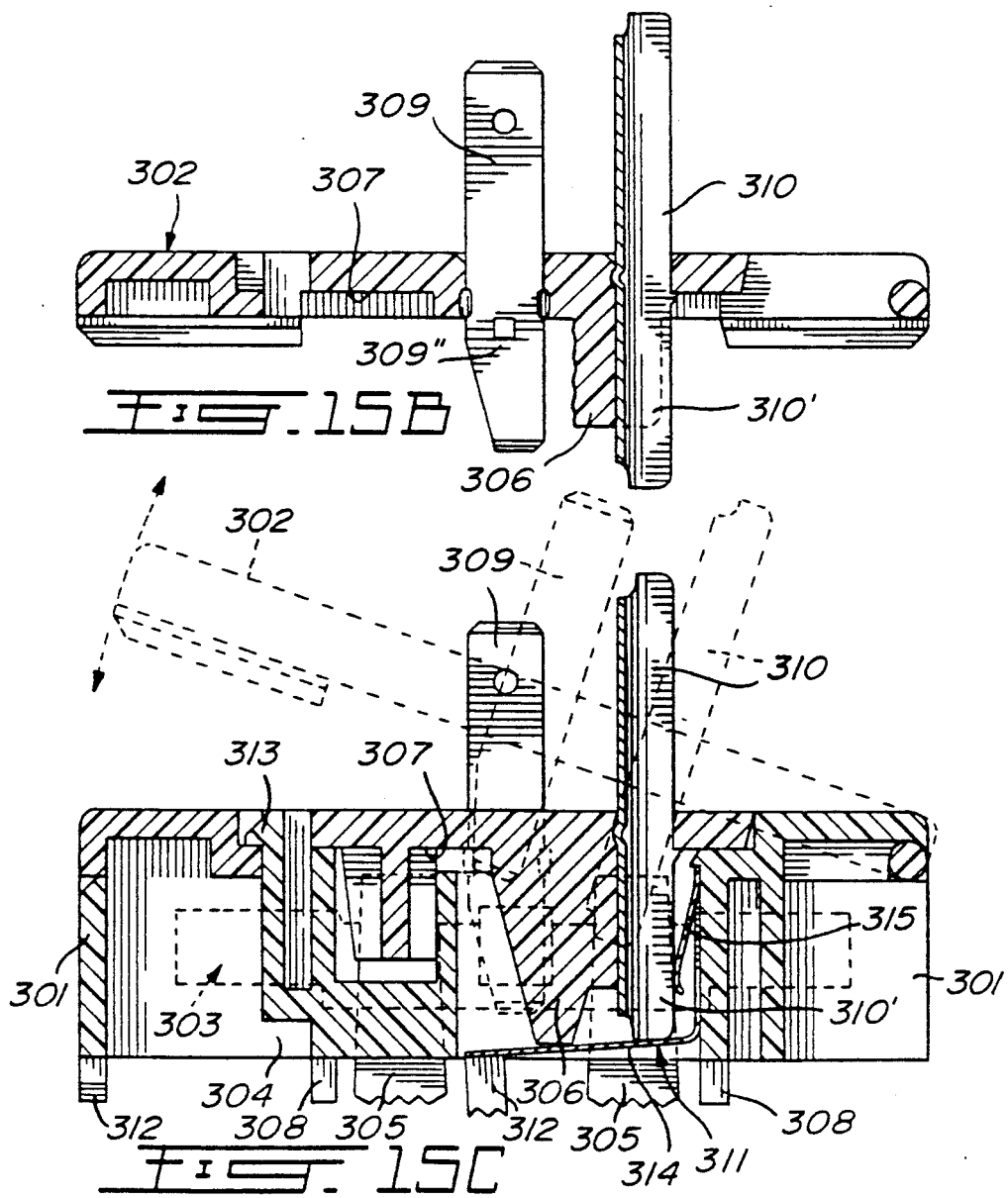

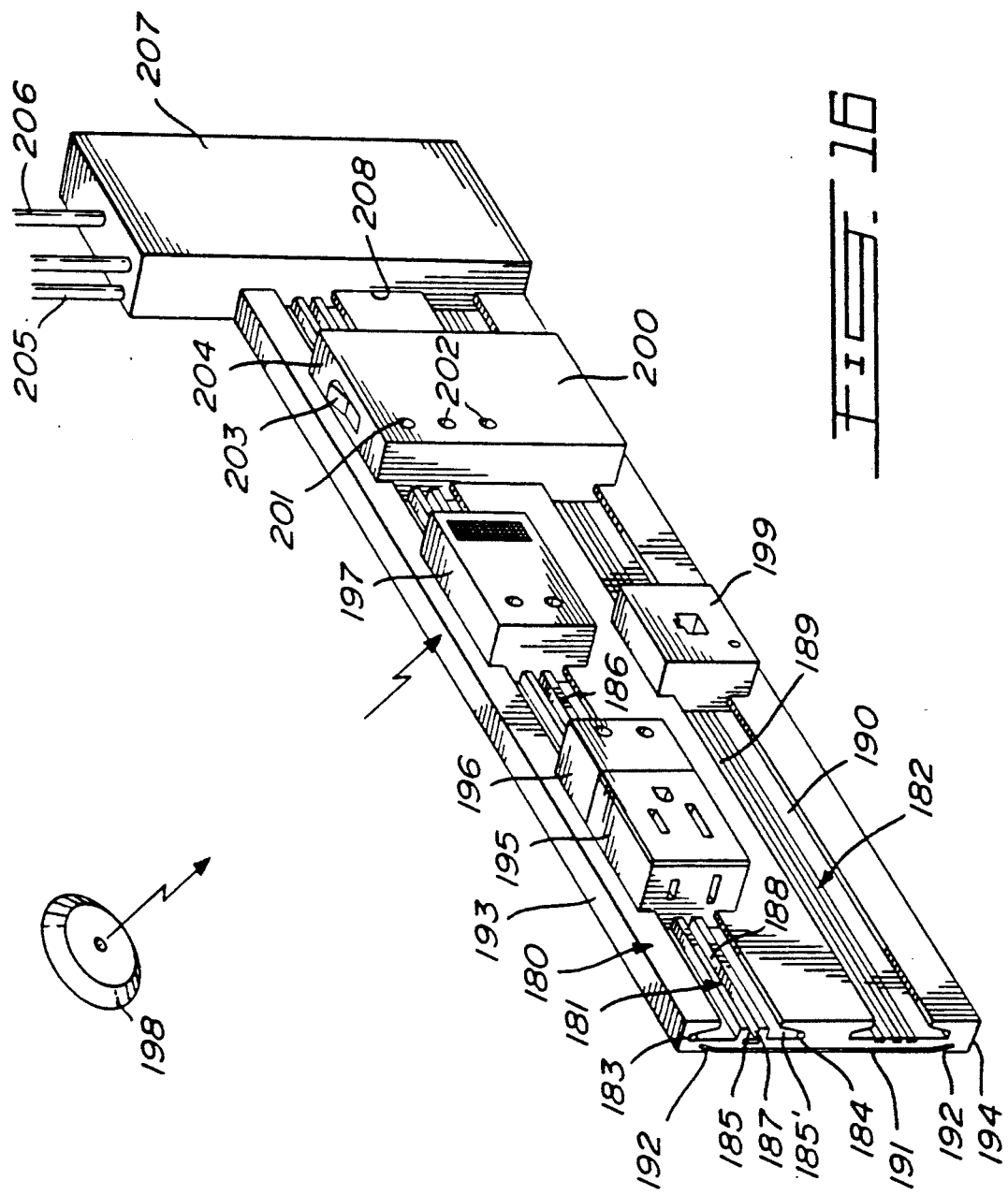

ELECTRIC DISTRIBUTING SYSTEM

TECHNICAL FIELD

The present invention relates to an electrical distribution system comprised of distribution tracks having current-carrying conductors and a ground conductor, and connector housings which slidingly receive end portions of the tracks to provide electrical connection thereto for supplying electrical power to the track or to interconnect track sections together.

BACKGROUND ART

Electrical distribution systems utilizing tracks and connectors are known, and an example of such a system is disclosed by the following Canadian patents: 581032; 615388; 633643; 635022; 644404; 649959; 655058; 668901; and 676526. Some of the problems encountered with known electrical distribution systems, such as that exemplified by the above referenced Canadian patents, are that it is difficult to connect the tracks to the connector elements as it is usually necessary to strip the heavy plastic insulation from an end portion of the tracks. This exposes the conductors and the ground wire, and due to their ease of deformation, it then becomes difficult to align all three of them into electrical connecting receptacles contained in an end wall of the connectors. It requires a certain skill to perform the stripping and interconnection, and therefore such systems have not been accepted and particularly are not suitable for use by the do-it-yourself person.

Another disadvantage of known prior art electrical distribution systems is that often the tracks are made of flexible material whereby the tracks can be bent for installation on walls which are at angles to one another. However, by bending the track one can never get a perfect angle joint, and this is not desirable. Furthermore, bending the track can also result in the breaking of the current-carrying conductors or the ground conductor embedded in the track, and such may not be readily visible requiring the system to be tested to find the fault. Still further, with some systems of the prior art, it is necessary to provide a plurality of accessories to connect to wall outlet receptacles depending if the track is to extend to the right or left of the receptacle, or upwardly or downwardly from the receptacle. If the socket of the outlet receptacles are inverted, then different connectors must be used to maintain the proper polarity on the track. This makes the system costly and more difficult to install.

SUMMARY OF INVENTION

It is therefore a feature of the present invention to provide an improved electrical distribution system and which substantially overcomes the above-mentioned disadvantages.

According to another feature of the present invention there is provided an electrical distribution system wherein the tracks slidingly connect into connector housings without having to strip the ends of the tracks to expose the current-carrying conductors and the ground connector, and wherein electrical contact is made with the connector housing automatically by simply sliding an end of the track into a connecting slot in an end wall of a connector.

Another feature of the present invention is to provide an electrical distribution system wherein the connector housing is a feeder housing for connection to a socket of a wall electrical outlet receptacle and wherein the housing has a removable connector block which maintains a constant polarity on the two current-carrying conductors in the track, regardless if the socket of the wall receptacle is inverted.

Another feature of the present invention is to provide an electrical distribution system wherein the connector housing is a union housing to interconnect track sections together, and wherein the union housing can be a straight housing, a right-angle housing or have an L- or T-shape, or be angled to go around inner or outer corners of walls.

Another feature of the present invention is to provide an electrical distribution system wherein one or more electrical receptacles are removably connected to the track, and wherein the receptacles are provided with two or more electrical sockets, one in the front wall and the other in the side wall, and wherein the receptacle is secured to the track by the closing action of a hinge cover which, when closed, cannot be opened by pulling an electrical plug out of the socket provided in the cover.

Another feature of the present invention is to provide an electrical distribution system wherein one or more electrical receptacles are slidingly connected to the tracks and cannot be removed therefrom unless they are slid out from an end of the track but are displaceable therealong and immovably secured at any desired location.

Another feature of the present invention is to provide an electrical distribution system wherein surge protection devices can be connected to one of the sockets of the electrical receptacle connected to the track to protect the entire track and equipment connected to the receptacle against undesirable surges in power.

Another feature of the present invention is to provide a electrical distribution system wherein the connector housing is a wall feeder housing connected directly to the electrical cables in an outlet box.

Another feature of the present invention is to provide an electrical feed housing for connection to an electrical socket of an electrical receptacle and which is capable of maintaining the phase of the current in a pair of conductors secured to the feed housing regardless if the socket is inverted.

Another feature of the present invention is to provide an electrical distribution system which can be incorporated into a baseboard together with a telephone distribution track for the connection of various devices thereto, such as fire alarms, intrusion alarms, surge protecting devices, timers, etc.

Another feature of the present invention is to provide an electrical distribution system in combination with a telephone distribution system incorporated in a baseboard formed of insulating material and which is extruded together with current-carrying conductors, ground conductors and telephone wires.

According to the above features, from a broad aspect, the present invention provides an electrical distribution system comprising one or more electrical tracks with each track being formed of a substantially flat elongated rectangular strip of electrical insulating material. Each strip has two current-carrying conductors retained in an undercut channel formed in side ribs extending end to end along opposed side edges of the strip with the channels facing one another inwardly of the top face of the strip. A ground conductor is embedded in the top face intermediate the conductors and extends longitudinally of the strip and parallel to the conductors. Guide means is formed in the top face of the strip and is spaced closer to one of the side ribs to permit proper polarity connection to the current-carrying conductors. An electrical connector housing slidingly receives an end portion of a track in a connecting slot in an end wall thereof and in polarity alignment with a pair of electrical side contacts engaging with a respective one of the current-carrying conductors through the undercut channels. An intermediate electrical contact engages with the ground conductor.

According to a still further broad aspect of the present invention there is provided a distribution track having an electrical distribution channel and a telephone line distribution channel disposed parallel thereto. The track is constructed of electrical insulating material. The electrical distribution channel has two current-carrying conductors retained in a respective undercut channel disposed along opposed side edges of the electrical distribution channel and extending end to end thereof. The undercut channels face one another inwardly of a top face of the electrical distribution channel. A ground conductor is embedded in an intermediate region in the electrical distribution channel and extends between and parallel to the conductors. A slot leads to the ground conductor. The telephone line distribution channel has spaced apart telephone wires extending in a flat bottom wall thereof. Means is provided to secure a telephone line tapping element to the telephone line distribution channel.

BRIEF DESCRIPTION OF DRAWINGS:

A preferred embodiment of the present invention will now be described with reference to the accompanying drawings in which:

FIG. 1 is a perspective view showing the electrical distribution system of the present invention connected to walls and fed by conventional electrical wall outlet receptacles;

FIG. 2 is a perspective view showing a vertical feeder housing connected to a socket of a wall electrical outlet receptacle;

FIG. 3 is a perspective view showing a horizontal feeder housing for connection to a socket of a wall electrical outlet receptacle;

FIG. 8 is a rear view, partly fragmented, of a T-shaped feeder housing showing the shape of the side connectors and their interconnections and with a few tracks connected thereto;

FIG. 9A is a plan view of a ground contact used in the T-shaped housing of FIG. 8;

FIG. 9B is an end view of FIG. 9A;

FIGS. 9C and 9D are side and top views respectively of a side contact used in FIG. 8;

FIG. 10A is a rear view of the back plate of a vertical feeder housing;

FIG. 10B is a side view of FIG. 10A;

FIG. 10C is a sectional end view of the back plate as shown in FIG. 10A showing the strip formations;

FIG. 10D is a rear view of the back plate of FIG. 10A showing the block formations;

FIG. 10E is a rear view of the cover plate showing the strip formations;

FIG. 10F is a section view through section lines 1—1 of FIG. 10E;

FIG. 10G is a front view of the cover plate;

FIG. 10H is a side view showing the vertical feeder housing assembled;

FIG. 10I is a plan view of the configuration of one of the side contacts which held between the cover plate and back plate of the vertical feeder housing;

FIG. 10J is a plan view of the other side contact;

FIG. 10K is a plan view of the ground contact;

FIG. 10L is a side view of FIG. 10K;

FIG. 12A is a plan view of the connector block associated with the vertical and horizontal feeder housing;

FIG. 12B is a rear view of FIG. 12A;

FIG. 12C is a section view through the connector block showing the position of the contact blades relative to the contact terminals of the side contacts;

FIG. 12D is a side view of FIG. 12A;

FIG. 12E is a fragmented view of the handle secured to the connector block;

FIGS. 13A and 13B are side and end views respectively of one of the contact blades secured to the connector block;

FIGS. 13C and 13D are side and top views respectively of the ground contact blade connected to the connector block;

FIG. 14A is a perspective view of the electrical receptacle of the present invention for connection to the track;

FIG. 14B is a side view of the receptacle housing showing the cover in its partly open position;

FIG. 14C is a top view of the receptacle housing of FIG. 14B;

FIG. 14D is an end view of the receptacle housing;

FIG. 14H is a simplified bottom view of the connector housing;

FIG. 15A is a front view of a power feed receptacle connectable to the female connector of an electrical extension cord;

FIG. 15B is a section view through section lines 3—3 of the power feed receptacle showing the hingeable cover in phantom lines;

FIG. 15C is a cross-section view along cross-section lines A—A of FIG. 15A; and

FIG. 16 is a perspective view showing a distribution track which may be used as a baseboard and having incorporated therein an electrical distribution channel constructed in accordance with the characteristics of the track of the distribution system shown in FIGS. 1 and 4, and also incorporating therein a telephone line distribution channel, and wherein a plurality of connecting devices are secured to both the electrical distribution channel and telephone line distribution channel.

DESCRIPTION OF PREFERRED EMBODIMENTS

Figure 4:
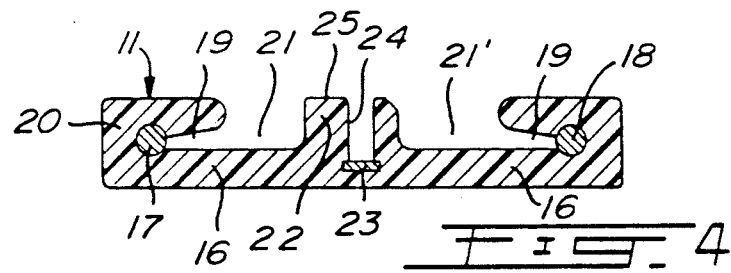
FIG. 4 is a transverse cross-section view through the electrical distribution track of the present invention.

Referring now to the drawings, and more particularly to FIGS. 1 to 4, there is shown generally at 10 the electrical distribution system of the present invention. It is comprised essentially of one or more electrical tracks 11 interconnected by connector housings 12 for interconnecting the tracks together, or interconnecting the tracks to wall electrical outlet receptacles 13. Electrical receptacles 14 are also removably connected to the tracks. The receptacles are also provided with electrical sockets 15 so that various electrical apparatus or devices can be connected to the electrical distribution system.

Referring more specifically to FIG. 4, each of the tracks 11 are formed of extruded plastics material which has good electrical insulating or di-electric properties and are shaped as elongated, substantially flat, straight, rigid, rectangular strips 16. Each strip or track of insulated material has two current-carrying conductors 17 and 18 embedded in an undercut channel 19 formed in side formations or ribs 20 and extend end to end along opposed side edges of the strip 16. As can be seen from FIG. 4, the channels 19 face one another inwardly and are tapered to shield the current-carrying conductors 17 and 18, but providing limited access thereto through the narrowing undercut channel. Each of the undercut channels 19 leads to an open channel 21 and 21'. As can be seen, channel 21 is narrower than channel 21'. The current-carrying conductor 17 for this design is the hot conductor, whereas conductor 18 is the neutral conductor in the electrical distribution system. The rib 25 and the different width channels 21 permit only devices, such as the receptacle 14, provided with specific attachments to be secured to the track.

The rib 22 is molded integrally with the elongated strip 16 and separates the open channels 21 and 21'. A ground conductive strip 23 is embedded within the rib 22 and access to the ground conductive strip 23 is provided through a slot 24 formed from the top face 25 of the rib and extending to the conductive strip 23. The purpose of the rib 22 is, of course, to delineate the open channels 21 and 21' and also to conceal the ground conductive strip 23 as much as possible, although there is no danger in contacting the ground conductive strip. Similarly, the undercut channels 19 protect the current-carrying conductors 17 and 18 and conceals them. In fact, the track provides better protection to the live conductor than does the slots that we find in the electrical sockets of conventional outlet receptacles, such as receptacle 13 as shown in FIG. 1.

As shown in FIGS. 1 to 3, there are various types of connector housings 12. Some of the housings, such as housing 26, constitute a union housing for joining two tracks, namely tracks 11' and 11" together along a straight line. Connector housings 27 and 27' and T-shaped and L-shaped union housings to interconnect tracks transverse to one another. The connector housings 28 and 28' are angled connectors made of two connecting sections disposed at an angle to one another, herein at right angles, so as to interconnect tracks along walls extending at right angles to one another. Connector housing 29 constitutes a vertical feeder housing to connect to an electrical socket 13' of an electrical outlet receptacle 13, but for disposing a track vertically with respect to the outlet, either in the upward or downward direction from the outlet. The connecting housing 30 constitutes a horizontal feeder housing, and it extends horizontally across the electrical socket 13' of the electrical outlet 13, and connects a track to one side or both sides of the electrical outlet receptacle 13. End caps 9 are connected at the free ends of the tracks to shield the end of the current-carrying conductor 17 and the ground conductive strip 23.

Figure 5:
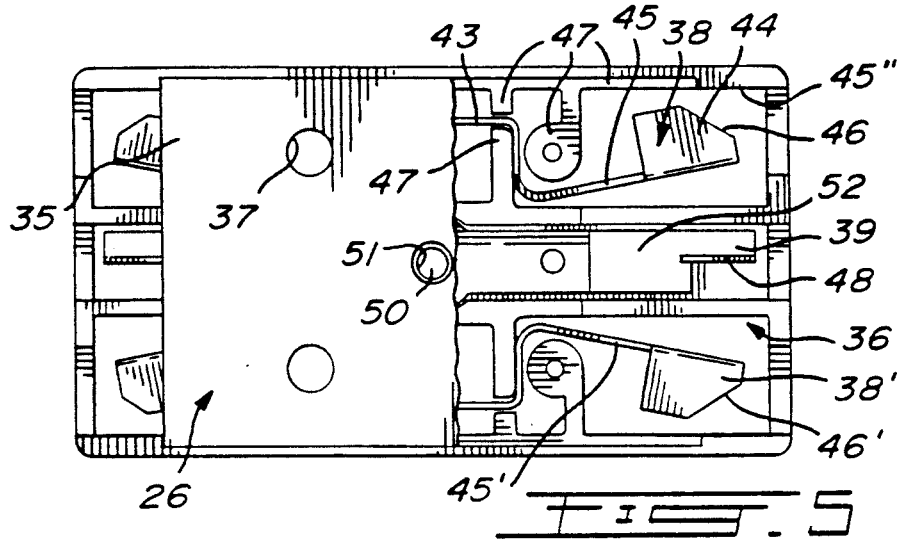
FIG. 5 is a fragmented rear view showing the construction of a union type feeder housing.
Figure 6:
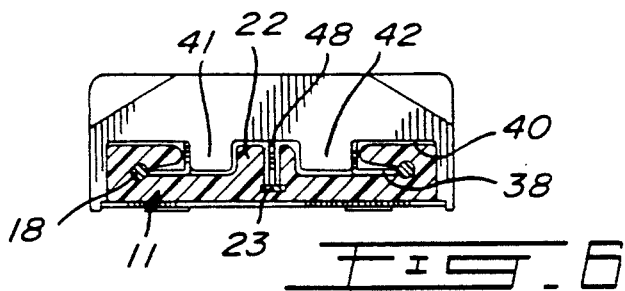
FIG. 6 is an end view of the housing of FIG. 5 showing the construction of the connecting slot and the position of the track and one of its side and ground contacts when engaged in a housing.

Referring now to FIGS. 5 to 6, there is shown the construction of the union connecting housing 26. As herein shown, this housing is comprised of a back plate 35 of electrically non-conductive material, and a cover 36 also molded from electrically insulating material with both the cover and back plate being connected together by fasteners or snap-fit connections. The back plate 35 has holes 37 for the passage of wires therethrough for connection to the side contacts 38 and ground contact 39 of the housing, as will be described later with reference to FIG. 7.

The union connecting housing 26 is provided with track connecting slots 40 at opposed ends thereof. These slots are configured to receive an end section of a track 11 therein. As can be seen from FIG. 6, the connecting slot has two depending ribs 41 and 42 with the rib 41 being wider than the rib 42, whereby the track can only be fitted in the connecting slot 40 a certain way so that the hot current-carrying conductor engages the contact 38 and the neutral conductor engages contact 38', and the polarity between the track and the housing is always maintained.

Figure 11A:
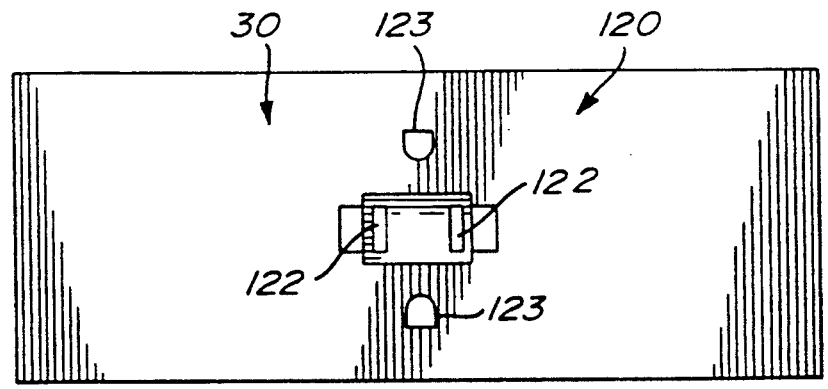
FIG. 11A is a front view of the cover of a horizontal feeder housing.
Figure 11B:
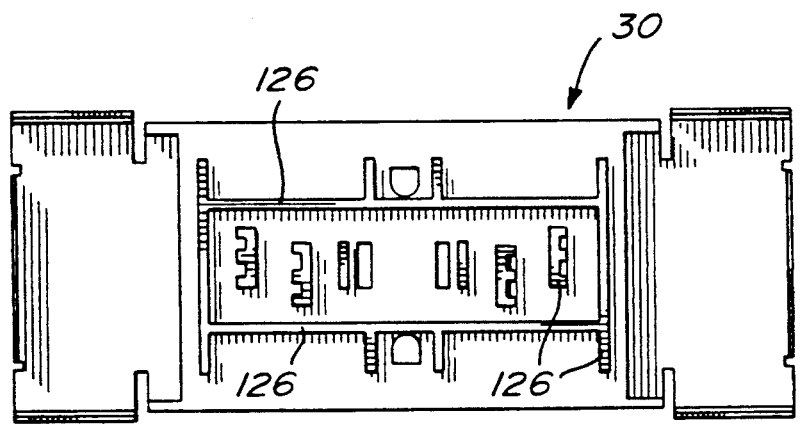
FIG. 11B is a rear view of FIG. 11A.
Figure 11C:
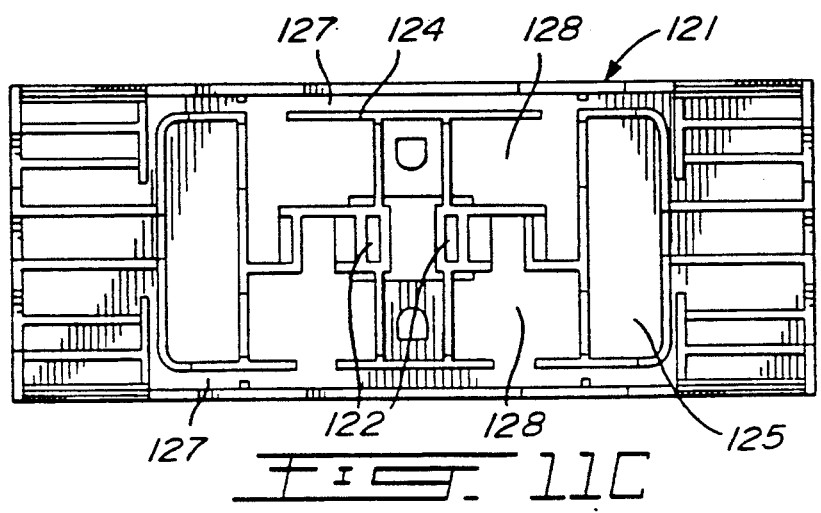
FIG. 11C is an inside view of the back plate of the horizontal feeder housing.
Figure 11D:
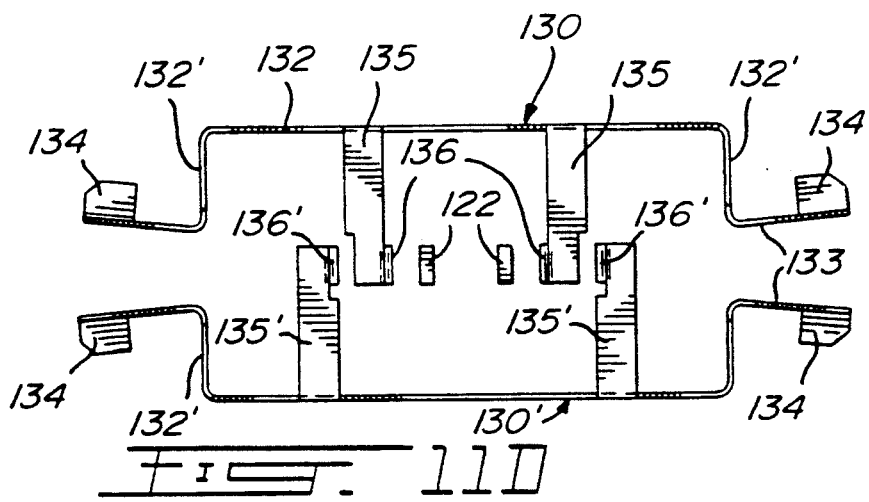
FIG. 11D is a plan view showing the position of the assembled position of two side contacts utilized in the horizontal feeder housing or a union housing.

The side contacts 38 and 38' are formed from a flexible metal strip capable of flexing and retaining its original shape. The side contacts have an attaching portion 43 and a contact blade portion 44. The end portion 45 is angled so as to bias the contact blade portion towards the inner side wall 45 of the connecting slot 40. The contact blade portions 44 are flat flanges formed in a forward end of the end portion 45 with the flange having an angled leading contact edge 46 to smoothly slidingly engage with a respective one of the current-carrying conductors 17 and 18 when the end portion of a track 11 is introduced in the connecting slot 40. The blade portions 44 are also positioned in a plane which is aligned with the undercut channels so that the contact blades will protrude in a respective one of the undercut channels 19 to electrically engage a respective one of the current-carrying conductors when the track is inserted in the slot 40. The side contacts 38 and 38' will maintain contact pressure with the conductors due to the spring action in the end portion 45 of the flexible metal strip. In the union housing 26, these contact blade portions are provided at opposed ends of the attaching portion 43, as shown in FIG. 11D.

As can also be seen from FIG. 5, the attaching portion of the side contacts 38 are held captive within the cover 36 by guide and retention formations 47, and this is well known in the art. The intermediate ground contact 39 also has a contact blade 48 which is disposed transverse to the connecting slot 40, as shown in FIG. 6, and is aligned with the slot 24 in the rib 22. The ground contact 39 is also made of spring metal material and has a central hub formation 49 which is secured about a post of the securement screw 50 extending through the central securing hole 51 to mount the union connecting housing 26 against a wall surface. A cap covers the top of the hole 51. The contact blade 48 is biased downwardly and the connecting wall 52 of the ground connector will flex upwardly when the end of the track is pushed into the connecting slot 40 to provide a contact force between the blade 48 and the ground conducting strip 23, as shown in FIG. 6. The side contacts 38 and the ground contact 39 are both formed from copper alloy material.

Figure 7:
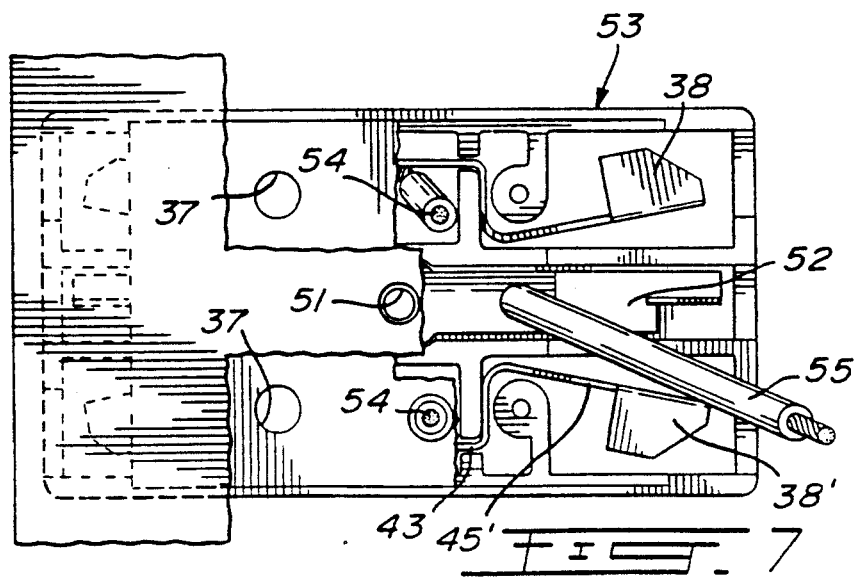
FIG. 7 is a view similar to FIG. 6, but wherein the feeder housing is a wall feeder housing connected directly to wall outlet cables in a wall outlet box.

Referring now to FIG. 7, there is shown a union housing, such as housing 26 of FIG. 5, but modified to constitute a feed housing 53, and wherein wires 54 are connected to the side contacts 38 and 38' and out through the holes 37 in the back plate to connect directly into a wall electrical outlet box (not shown). A ground wire 55 connects to the ground contact 52 and also connects to a grounding lug (not shown) in the outlet box. From this feed housing, straight sections of tracks 11 are connected and branch out to the various other branching housings, such as housings 27, 27', 28 and 26, to provide a rectilinear track distribution system. One of these branching connecting housings, namely the T-housing 27, will now be described with reference to FIGS. 8 and 9A to 9D.

As herein shown, the T-shaped housing 27 has three connecting slots 40, one in a respective one of three end walls 56 of the housing. Two of these end walls 56' are disposed in alignment while the other end wall is disposed at right angles thereto. The side contacts 57 are constructed as shown in FIGS. 9C and 9D, and are also stamped and shaped from a copper alloy sheet having been heat treated to provide spring action. The contacts are formed from a strip of this copper and shaped in two right-angled sections with common connecting arms 58, and contact blades 59 at opposed ends thereof for engaging a common one of the current-carrying conductors in adjacent track ends positioned within the connecting slots 56 and 56'. The end portion 60 of these contacts are bent inwardly, as herein shown, to provide spring contact pressure. These generally U-shaped contacts 57 are provided in the top end of the housing 27 to interconnect the transverse track to both of the horizontal tracks.

Insulated conductive wires 61 interconnect the contacts together within the housing to maintain the proper polarity. The bottom contacts 62 interconnect the neutral current-carrying conductor 18, as illustrated in FIG. 8, and these contacts consist essentially of a connecting arm 63 having a contact blade portion 64 at the free end thereof. Both of the contacts 57, as well as the contacts 62, are secured in the housing by guide and retention formations 65.

The construction of the ground contact is illustrated at 66 in FIG. 9A. It also is formed of copper alloy and, as herein shown, comprises a hub 67 about which extends three connecting arms 68. Transverse contact blades 69 are formed at the free ends of each of the arms 68, with each of the contact blades extending into the slot 24 in the free ends of each of the tracks 11 secured to the connecting channels 56 and 56'. The hub 67 fits about a locating post 70 central of the housing 27, and a through bore 71 extends through the post to secure the T-housing 27 to a wall by means of a fastener, such a fastener 72, shown in FIG. 1.

Referring now to FIGS. 10A to 10L and 12A to 13D, there will be described the construction of the vertical feeder housing 29. As herein shown, the feeder housing is comprised of a back plate 75 which is of substantially rectangular shape and has a recessed end section 76 to form the connector slot. The rear face 77 of the back plate 75 is a flat face, and provided with a pair of apertures 78 to receive therein the blades and grounding prong of the connector block 100, as shown in FIGS. 12A to 12D. These apertures 78 are disposed in spaced apart side-by-side alignment. A grounding prong receiving aperture 79 is also disposed between the contact blade receiving apertures 78 and spaced therefrom on a respective one of opposed sides of the apertures 78. A plurality of aligning formations 80 are provided in the inner wall 81 of the back plate 75 to position and retain the side contacts 82 and 83, as shown in FIGS. 10J and 10I, respectively, and the ground contact 84, as shown in FIGS. 10K and 10L. Hooking prongs 85 are provided in the opposed side walls 86 of the back plate to engage with prongs in the cover plate 87, as shown in FIGS. 10D to 10H to secure the back plate and cover in snap-fit engagement. The cover plate 87 is also a rectangular plate of the same size as the back plate to mate therewith, and is provided on the flat outer surface 88 thereof with a pair of contact blade receiving apertures 89, also disposed side by side and spaced apart to align with the apertures 78 in the back plate 75. A grounding prong-receiving aperture 90 is also provided intermediate the apertures 89 and on opposed sides thereof, and also aligned with the grounding prong-receiving apertures 79 in the back plate. An end portion of the cover plate 87 also has an extension 91 to connect with the recessed section 76 of the back plate so that when these plates are assembled together a flat recessed portion 92, shown in FIG. 10H, is constituted to receive an end portion of the face plate 93 of the electrical outlet receptacle 13, as shown in FIGS. 1 to 3.

Referring now to FIGS. 10I and 10J, there is shown the side contacts 82 and 83 which are received within the guide channels 94 and 95 formed in the back surface 96 of the cover plate 87. The ground contact 84 is retained in the central area 97 of the back surface of the cover plate. When both cover plate and back plate are assembled, the formations 80 which project from the inner wall 81 of the back plate abut over the flange walls 104, 106 and surface 98 of contacts 82, 83 and 84 to retain them immovably in position.

The side contacts 82 and 83 are also formed of copper alloy material and define a contact blade portion 101 secured to an end angulated portion 102. The attaching portion 43 is provided with a pair of blade contacting portions 103 which form contact terminals for engagement by the contact blades 110 and 110' of the connector block 100, as shown in FIG. 12C. These blade contact portions are also formed in a flange wall 104 respectively of spaced apart arms 105 extending parallel to one another. The flange wall 104 is engaged by the formations to hold the contact securely within the feeder housing. The other side contact 83 has a similar shape to contact 82 with the exception that the side arms 106 thereof are spaced further apart, whereby when both contacts are assembled within the feeder housing, the blade contact portions 107 are disposed outside the blade contact portions 103 and in alignment thereof, and also in alignment with the blade-receiving aperture 78 and 89 formed in the back plate and cover plate respectively. The location of these blade contact portions 103 and 107 relative to the apertures 78 is illustrated in FIG. 10E.

Referring now more specifically to FIG. 12A to 13D, there will be described the construction of the connector block 100. As herein shown, the connector block 100 is of a substantially rectangular configuration and connects over the front wall 99 of the cover plate 87 in the top portion thereof over the apertures 89 and 90, as shown in FIG. 10H. A pivoting handle member 110, as more clearly shown in FIGS. 12D and 12E, is of U-shaped configuration. It is provided with hinge projections 111 facing inwardly at opposed free ends of the side arms 112 thereof and retained within a pair of opposed hinge-receiving cavities 113 formed in the side walls 116 of the connector block. Molded within the connector block are a pair of contact blades 110 and 110' and a grounding prong 114. The contact blades, as shown in FIGS. 13A and 13B, are blades formed with a U-shaped connecting end to define a contact blade portion 110' and a short inner blade end portion 117' extending parallel thereto. The intermediate section 115 is formed as an attaching flange when molded within the connector block. The other blade 110 is similarly shaped, except that the intermediate attaching flange 115 is of shorter length whereby the blade portion 110 and the blade end portion 117 are more closely spaced. These short blade end portions 117 and 117' constitute inner terminal ends of the contact blades 110 and 110' for a purpose as will now be described. The end portions 117 and 117' may be considered as contact terminals. The ground contact 114, as shown in FIGS. 13C and 13D, has a flange end 114' for retention in the connector block 100 when injection molded.

The purpose of the connector block is to maintain the proper polarity of the current connected to the current-carrying conductor 17 and 16 of the tracks 11 from the sockets of the wall outlet receptacles 13. However, it sometimes arises that the sockets 13' of the electrical outlet receptacles 13, shown in FIG. 1, are installed upside down. That is to say, the ground slot 13" of the socket is disposed above the hot and neutral slots of the socket rather than below. The connector block was conceived to invert the polarity connection between the socket and the track when mounted upside down to always maintain a constant polarity in the wires of the distribution tracks.

The connector block 100 works in combination with the side contacts in the feeder housing. The shape of the contact blades 110 in the connector block has inner contact terminals constituted by their blade end portions 117 and 117'. As shown in FIG. 12C, the blade contact portions 103 and 107 are so disposed that when the connector block is fitted through the feeder housing with the ground contact disposed above or below the socket slots, one of the blade end portions, herein 117, will contact one of the blade contact portions, herein 103', and the other blade end portion 117' will contact the terminal or blade contact portion 107'. If the electrical socket was reversed, then the connector block would also be reversed, and the blade end portion 117' would contact the other contact 107 and the blade end portion 117 would contact the other contact terminal or blade contact portion 103. Therefore, the side blade contacts 101 and 101' of both side contacts 82 and 83 are always connected to a common one of the hot side or neutral side of the socket, regardless if the socket is installed right side up or upside down.

The center contact 84 consists of a straight flat blade 98 with indentations and which is engaged by the formations in the back plate 75. The contact 84 has a contact blade 84' at a free end thereof and provided with a pair of vertically spaced contact terminals 98' which align with a respective one of the grounding prong-receiving slots 79 and 90 formed in the back plate and cover plate, respectively, for engaging with the ground prong 114 of the connector block when positioned in the grounding apertures.

Referring now to FIGS. 11A to 11G, there will briefly be described the construction of the horizontal feeder housing 30, as shown in FIG. 1. The horizontal feeder housing 30 is constructed in a similar fashion as the vertical housing feeder housing just described. The housing 30 is formed of a cover plate 120 and a back plate 121. Both the cover plate and back plate are also provided with blade-receiving apertures 122 disposed in similar alignment as previously described. A ground prong-receiving aperture 123 is also disposed on opposed sides of the apertures 122 for receiving the ground prong of the connector block therein. Locating projections 124 are provided in the surface 125 of the back plate 121, and further arresting projections 126 are provided in the rear face of the cover plate 120 to retain within the locating channels 127 and 128, the side contacts 130 and ground contact 131, respectively, and as is obvious to a person skilled in the art.

Figure 11E:
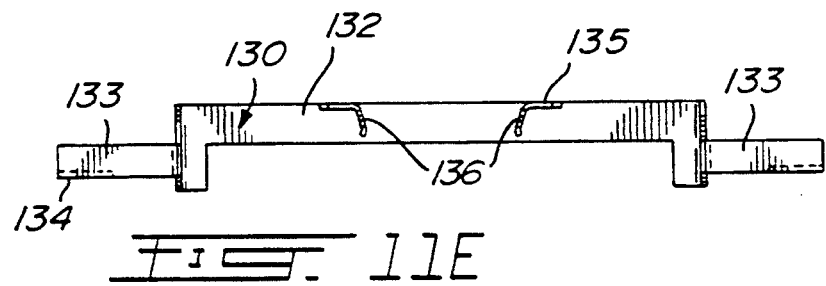
FIG. 11E is a side view of one of the side contacts shown in FIG. 11D.
Figure 11F:
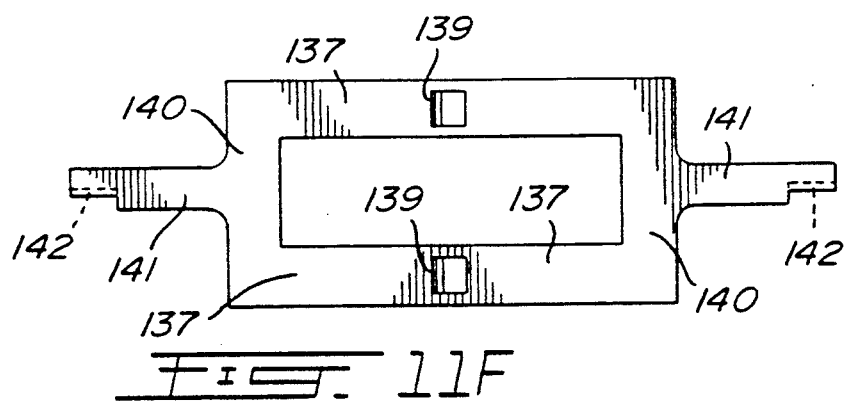
FIG. 11F is a plan view of the ground contact utilized in a horizontal feeder housing or union housing.

As shown in FIGS. 11D and 11E, the side contacts 130 are substantially elongated shallow U-shaped contacts defining an elongated connecting arm 132, short side arms 132', and an angled end portion 133 having a contact blade end portion 134. A pair of bridge arms 135 extends spaced apart and transversely to the connecting portion 132 and has contact terminals 136 adjacent an end thereof and positioned in alignment with one another. The bridge arms 135' in the other side contact 130' are spaced further apart and also have contact terminals 136' aligned with one another, and when installed in the horizontal feeder housing, these contact terminals are all in straight alignment with one another and with the apertures 122, as illustrated in FIG. 11D. Accordingly, regardless of the position of the connector block as dictated by the mounting of the socket of the electrical outlet receptacle, the contacts 130 and 130' maintain a constant polarity.

Figure 11G:
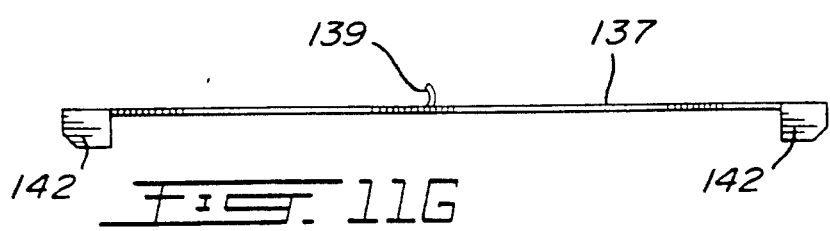
FIG. 11G is a side view of FIG. 11F.

The ground contact 131, shown in FIG. 11G, is constructed with opposed flat side arms 137 which are engaged by the formations within the housing, and these side arms are punched out to form apertures 138 and contact terminals 139 to engage with the grounding prong 114 of the connector block 100. The opposed ends of the side arms 137 are interconnected by bridge arms 140 and a central extension arm 141 extends therefrom and carries the ground contacting blade 142 at a free end thereof. The side contacts 130 and the grounding contact 131 are also formed of copper alloy material which is treated to provide spring properties and to spring back to its original shape after bending moments are removed therefrom.

Figure 14E:
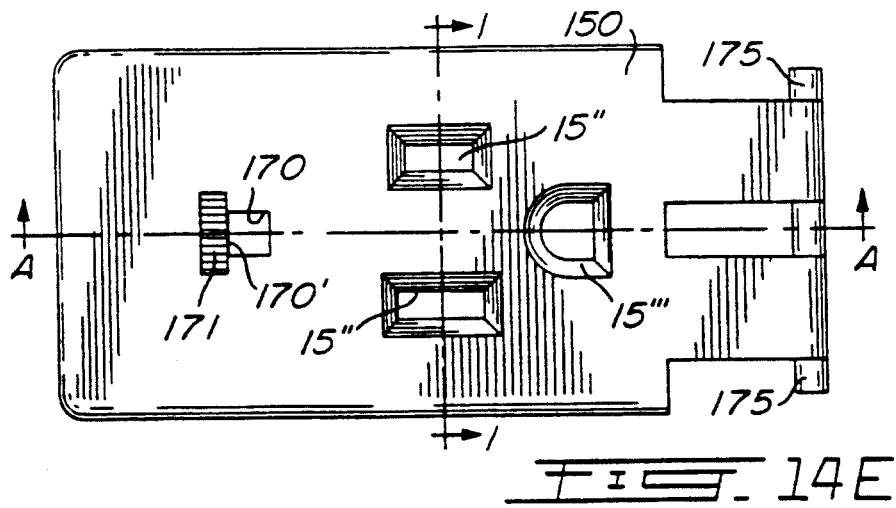
FIG. 14E is a top view of the hinge cover of the electrical receptacle.
Figure 14F:
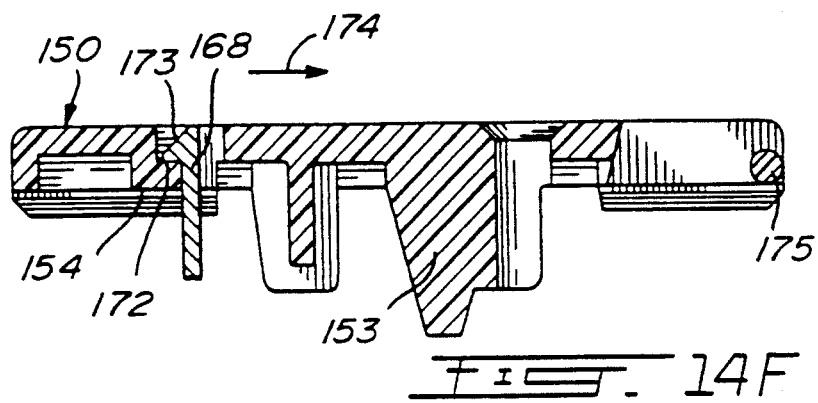
FIG. 14F is a section view through the cover shown in FIG. 14E along section line A—A.
Figure 14G:
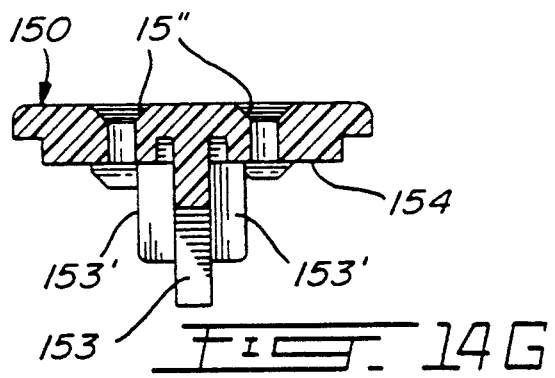
FIG. 14G is a section view along section line B—B of FIG. 14E.

Referring now to FIGS. 14A to 14J, there will be described the construction of the electrical receptacle 14, as shown in FIG. 1. As herein shown, the electrical receptacle 14 is formed with an electrical socket 15 in the top surface of the hinge cover 150. A further socket 15' may be formed in one or both end walls 151 of the housing 152 of the receptacle 14. The end sockets 15' may be provided with a ground prong slot or may not have such a slot depending on the configuration of the housing 152. The hinge cover is provided with projecting formations 153 in a rear face 54 thereof to actuate spring contact members 155, as shown in FIG. 14H, having gripping ends 155' extending out of the bottom wall 156 of the housing 152 to project within the undercut channels 19 of the track 11 to engage with the current-carrying conductors 17 and 18, and as will be described later.

As shown in FIG. 14D, the housing 152 is provided with foot extension 157 extending from the bottom wall 156 of the housing to retain the housing bottom wall elevated over the flat track channels 21 and 21'. A channel 158 provides for the passage of the rib 22 in the track and is offset from the central vertical axis 159 of the housing so that the electrical receptacle 14 can only be positioned a certain way within the track to main a constant polarity between the track conductors and the socket slots 15'. The receptacle 14 is retained within the track by closing the hinge cover 150 to actuate the spring contact members 155 which project within the undercut channels and engage the current-carrying conductors 16 and 17 with a spring force. However, the foot plates 157 may also be provided with a toe extensions 159 which engage in a respective one of the undercut channels 19 of the track 11 to prevent the electrical receptacles 14 from being removed from the track. In such an application, the electrical receptacle 14 would be connected to the track by inserting it from a free end of the track and sliding it therealong. Accordingly, the electrical receptacle 14 becomes displaceable therealong, but retained captive by the opposed undercut channels 19 in the track, and such receptacle construction may be favorable for certain applications where it is desirable that these receptacles 14 not be removed.

Figure 14I:
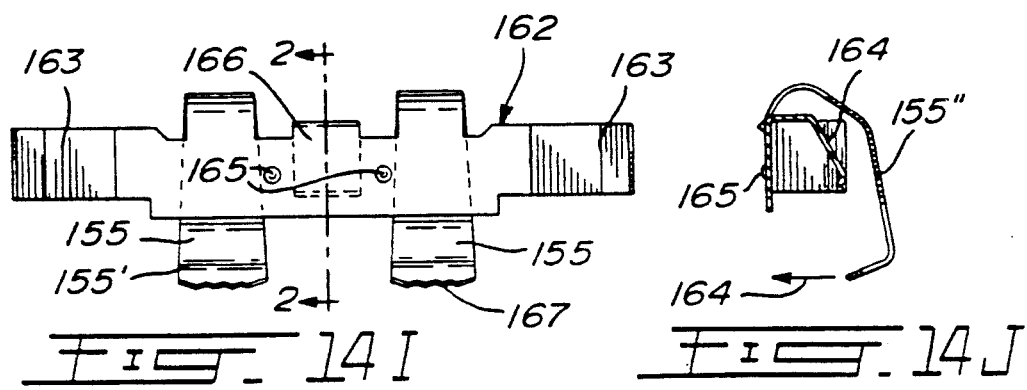
FIG. 14I is a side view of the current-carrying conductor contacts.
Figure 14J:
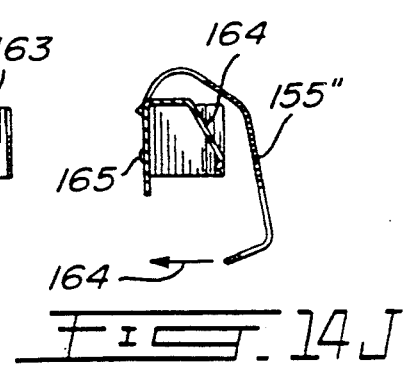
FIG. 14J is a section view along section lines 2—2 of FIG. 14I.

As shown in FIG. 14C, the housing 152 is a hollow housing provided with various formations 160 and channels 161 to receive the blade slot contacts and grounding contacts. The side contact 162, as shown in FIGS. 14I and 14J, are also formed from copper alloy material and have blade contacts 163 at opposed ends thereof for alignment with the slots 15' in opposed end walls 151 of the housing and an intermediate side contact 164 for alignment with one of the slots 15" in the hinge cover 150. The spring contact member 155 are also integrally formed with the side contacts to connect to one of the current-carrying conductors 16 and 17 of the track. One of these contacts 162 is provided on both sides of the housing. A ground contact (not shown) also connects to the ground slot 15''' provided in the cover 150. As shown in FIG. 14J, the spring contact member 155 has an inclined wall portion 155" which is slidingly engaged by a displacement post 153' extending from the rear face 154 of the hinge cover 150 so as to displace the spring contact member 155 inwardly in the direction of arrow 164 to extend within the undercut channels of the track. A pair of retention tabs 165 is provided in the outside wall 166 of the side contact to engage within a pair of depressions (not shown) formed within the inner side walls of the hollow housing to retain the side contacts in frictional snap-fit within the guide channels 161 of the housing.

As shown in FIGS. 14B and 14C, a spring-loaded catch 168 projects from above the top edge 169 of the housing 152 and is received within a retention cavity 170 formed within the hinge cover 150. The retention cavity 170 has a step ledge 171 so that when the cover is closed, the retention catch 168 projects within the retention cavity 170. The catch 168 has a lip formation 172 under an angle leading edge 173 to which moves over the step wall 171 to retain the hinge cover secured over the housing 152 after the leading edge clears the cavity front edge 170'. Accordingly, if an electrical plug is connected to the cover, and a pulling force is exerted to the cable of the plug, the cover will not open accidentally. In order to open the cover, it is necessary to move the retention lug 168 rearwardly in the direction of arrow 174 and to thereafter hinge the cover open. The hinge end of the cover is provided with a hinge pin 175 formed integrally therewith on opposed sides thereof, and it is received captive in the top end 176 of end wall 151'.

It is pointed out that for providing power to electrical or electronics equipment which require a common polarity feed and protection against surges, a track system can be provided with a feed housing 29 or 30 and displaceable electrical receptacles 14 which would be provided with a surge-protecting device 179, see FIG. 14A, secured to an end socket 15' of the electrical receptacle housing 152. If a surge in the current supply takes place, then the surge-protecting device 179 would cause an open circuit to protect the equipment which is connected to the receptacle 14. Accordingly, the surge protecting device 179 would be connected in series between the wall socket and the other sockets 15 and 15' in the receptacle 14. This would require modification to the configuration of the plug in points of the side contacts, as shown in FIGS. 14I and 14J and the interconnection within the housing, but such modifications are obvious to a person skilled in the art. The advantage of having the surge-protecting device as a plug-in device is that, once the protecting device has operated and its switching device is opened, it is merely necessary to replace the surge protector 179 with another one at minimum cost. The surge protector is also provided with pilot lamps 178 in the top wall 177 thereof to indicate an operating or non-operating condition of the device.

Referring now to FIGS. 15A through 15C, there is shown the construction of a power feed receptacle 300 for detachable securement to the electrical track 11 as shown in FIG. 1. This power feed receptacle is utilized for connecting power to the track directly from a female connector of an electrical extension cord (not shown), when there is no power on the track or when not accessible to the track. Such power feed receptacle would find utility, for example, if tracks were mounted on transportable display screens or panels such as those we find at trade shows, and which are transported from site to site. Power could be brought to these panels merely by an extension cord.

The power feed receptacle 300 is similar in construction to the receptacle 14 as shown in FIGS. 14, and consists of a housing 301 having a hinge cover 302 hingedly secured thereto. A pair of side contact members 303 is provided and retained in the housing side wall 304 and these side contacts are provided with one or more spring contact members 305 which are displaceable to engage with a respective one of the current-carrying conductors 17 or 18 in the track when the cover 302 is closed. As shown in FIG. 15C, the cover is also provided with a displacement post 306 extending from a rear wall 307 thereof to engage with the spring contact members to cause their outward displacement. When the spring contact members are engaged with the current-carrying conductors, the housing 300 is retained over the track. Foot extensions 308 also extend from the rear of the housing 300 to maintain the housing elevated over the track to clear the rib 25.

As herein shown, cover 302 is provided with a pair of contact blades 309 and 309', and a grounding prong 310 which extends from a top face 311 of the cover 302 for connection to a female connecting plug of an electrical extension cord (not shown, but obvious to a person skilled in the art.).

The foot extensions 308 may also be provided with toe extensions 312 on at least opposed side ones of these foot extensions for slidable retention in the undercut channels 19 of the track so as to slidingly displace the receptacle preventing the removal from the track.

As shown in FIG. 15B, the contact blades 309 and the grounding prong 310 are provided with inner extension portions 309'' and 310' which protrude inwardly from the cover rear face 307. The inner extension portion 309'' of the contact blades 309 and 309' engages a respective one of the side contact members 303 when the cover 302 is closed over the housing 301. Similarly, the extension portion 310' of the grounding prong 310 engages a ground engaging contact 311 which has a blade portion 312 that enters the channel 24 to access the conductor strip 23 of the track. The cover is retained in a closed position by a spring-loaded catch 313 which is identical in construction to the catch 168 described with respect to FIG. 14. When the cover is closed the displacement post 36 abuts the spring arm 314 of the ground contact member 311 to maintain pressure thereon. The grounding prong extension portion 310' is in engagement with this contact portion 314 and also with a side spring contact 315 formed integrally with the ground engaging contact 311.

Referring now to FIG. 16, there is shown a distribution track 180 which may be used as a baseboard with a molded shaped. The track 180 is extruded from plastic insulating material. The track has an electrical distribution channel 181 and a telephone line distribution channel 182 disposed parallel thereto. The electrical distribution channel has two current-carrying conductors 183 and 184, also retained captive in a respective undercut channel 185 and 185' respectively, disposed along opposed side edges of the electrical distribution channel 181 and extending end to end of the track 180. The undercut channels 185 and 185' face one another inwardly of a top face 186 of the electrical distribution channel. A ground conductor 187 is embedded in an intermediate region in the electrical distribution channel and extends between and parallel to the conductors 183 and 184, and disposed within a rib 188. Accordingly, the electrical distribution channel is formed in the same manner as the electrical distribution track 11, as illustrated in FIGS. 1 and 4, with the exception that it may not be necessary to provide a rib to embed the ground conductor. Other means may be provided to prevent any electrical accessory or device to be incorrectly connected to the channel, such as a rib disposed elsewhere on the surface 186, or a channel provided in that surface.

The telephone line distribution channel 182 is provided with spaced apart telephone wires 189 embedded in the surface 190 of the telephone channel 182. It is pointed out that the wires 183, 184 and 189, as well as the ground conductor 187, are all extruded together with the track 180. Also, all of these conductors are bare conductors.

Attachment means in the form of a support plate 191 is secured to a wall surface to removably secure the track against the wall. The track is provided with recesses 192 adjacent the top rear edge 193 and bottom edge 194 thereof to snap-fit the track over the support plate 191. Other removable securement means may be provided, such as providing holes (not shown) along the track to insert fasteners directly through the holes and through a wall surface.

As shown in FIG. 16, the distribution track may have various utilities. One such utility would be to install electrical connectors 195, similar to the connector 14, as shown in FIG. 1. That connector may also have a surge-protecting device 196 plugged into an end wall socket thereof. A fire detector alarm device 197 may also be connected to the electrical distribution channel 181 to tap to the power supply for its circuitry. The unit could incorporate an alarm circuit as well as a receiver circuit to receive alarm signals from smoke detector devices 198 that may be provided in an area to be protected. Additionally, the device 197 may also have a transmitter circuit to transmit an audible fire condition alarm signal, or else be connected directly to a telephone jack, such as the telephone jack 199 which is connected to the telephone line distribution channel 182 to transmit a fire alarm code to a central station.

Another application of this distribution track could be for mounting an intrusion alarm system, such as the alarm device 200. This device would connect to both the electrical distribution channel and the telephone line distribution channel and would include a receiver transmitter circuit to receive alarm signals from detectors (not shown) placed in an area to be detected, and would transmit dial tone signals to the telephone jack 139 and a telephone connected thereto to ring a central alarm network. Alternatively, infra-red detectors may be built into the unit 200 and be provided with a pilot lamp 201 to indicate the condition of the detector. Such devices could be mounted on the track and adjacent door openings. Other pilot lamps 202 could provide other indications of the alarm circuits. A switch 203 may be provided on the housing, preferably on the top wall 204 thereof. The electrical and telephone feed cables 205 and 206 respectively are connected to the track through a distribution connector box 207, and it may be provided with a side slot 208 similar to the connector slot of the feed housings 26 and 30 and provided with contacts to engage all of the conductors in both channels 181 and 182. It is pointed out that other devices, not shown, can be connected to these tracks to perform similar or different type tasks. For example, automatic timer boxes could be secured to the tracks to shut off and to switch on lamps connected thereto, and other control devices could be connected to the track to switch on baseboard heating units, etc.

It is within the ambit of the present invention to cover any obvious modifications of the preferred embodiment described herewith, provided such modifications fall within the scope of the appended claims. As an example only, an electrical feed housing having a connector block similar to the one herein described may be provided and connected or molded at the end of a two- or three-wire electrical cable, so as to maintain a constant polarity between the wall socket and the hot blade of a plug at the end of the cable. The system can also be adapted to the voltage source as utilized in various countries and not limited to North American standards.

The embodiments of the invention in which an exclusive property or privilege is claimed are defined as follows:

1. An electrical distribution system comprising one or more electrical tracks, each track being formed of a substantially flat elongated rectangular strip of electrical insulating material, each strip having two current-carrying conductors retained in undercut channels formed in side ribs extending end to end along opposed side edges of said strip with said channels facing one another inwardly of a top face of said strip, a ground conductor retained in said top face intermediate and parallel to said conductors, guide means spaced closer to one of said side ribs to permit proper polarity connection to said current-carrying conductors, and an electrical connector housing slidingly receiving an end portion of said track in a connecting slot in an end wall thereof in polarity alignment with a pair of electrical side contacts engaging with a respective one of said current-carrying conductors through said undercut channels and an intermediate electrical contact engaging with said ground conductors through said slot in said intermediate rib; each side contact of said pair of electrical side contacts having a flexible metal strip with an attaching portion held securely in said connector housing, a flexible arm portion and a contact blade portion, said flexible arm portions of said side contacts biasing said side contact blade portions outwardly from one another in the plane of said connecting slot and towards opposed end edges of said connecting slot, said side contact blade portions being positioned in a plane aligned with said undercut channels when said end portion of said track is slid into said connecting slot so that said contact blades will protrude in a respective one of said undercut channels to electrically engage a respective one of said current-carrying conductors while maintaining contact pressure.

2. An electrical distribution system as claimed in claim 1 wherein said guide means is an intermediate rib, said ground conductor being embedded in said rib, and a slot formed in said rib for access to said ground conductor.

3. An electrical distribution system as claimed in claim 1 wherein each said side contact blade portion is a flat flange contact formed in a forward edge of said flexible arm portion, said side contact blade portion having an angled leading contact edge to slidingly engage with a respective one of said current-carrying conductors when said end portion of said track is introduced in said connecting slot.

4. An electrical distribution system as claimed in claim 1 wherein said intermediate electrical contact engaging with said ground conductor comprises a flexible metal ground strip having an attaching portion held securely in said connector housing, a flexible arm portion and a ground contact blade portion extending transversely of said connecting slot, said ground contact blade portion being biased downwardly when said ground contact blade protrude in said slot of said intermediate rib to electrically engage said ground conductor and maintain contact pressure.

5. An electrical distribution system as claimed in claim 4 wherein said side contacts and said intermediate electrical contact are constructed from copper alloy material.

6. An electrical distribution system as claimed in claim 1 wherein said electrical tracks are straight flat tracks securable at opposed ends between a pair of connector housings or at least one of said connector housings and a termination cover.

7. An electrical distribution system as claimed in claim 1 wherein said electrical tracks are straight flat tracks securable over a wall surface by fasteners disposed through said tracks from said top face of said strip.

8. An electrical distribution system as claimed in claim 1 wherein opposed ends of said tracks have straight transverse ends with said current-carrying conductors concealed by said side ribs.

9. An electrical distribution system as claimed in claim 1 wherein one or more electrical receptacles are adapted to be detachably secured to each of said one or more electrical tracks, each electrical receptacle having a socket defined by blade receiving slots and a ground slot for connecting one or more electrical plugs thereto, means establishing electrical contact with said current-carrying conductors, and locking means to arrest said receptacles at a desired location along said track.

10. An electrical distribution system as claimed in claim 1 wherein said electrical connector housing is a union housing having two or more of said connecting slots, one in a respective end wall thereof; said connector housing interconnecting two or more of said electrical tracks end to end.

11. An electrical distribution system as claimed in claim 10 wherein said union housing is an L-shaped housing having two of said connecting slots, one of said connecting slots being provided in a respective end wall thereof disposed at right angle to one another.

12. An electrical distribution system as claimed in claim 10 wherein said union housing is a T-shaped housing having three of said connecting slots, one of said connecting slots being provided in a respective one of three end walls thereof with two of said end walls in alignment and the other disposed at right angle.

13. An electrical distribution system as claimed in claim 10 wherein said union housing is a right angled housing having two of said connecting slots, one of said connecting slots being provided in a respective aligned end wall thereof, said right angled housing having two sections disposed at right angles to one another and having its current-carrying conductors and ground conductor extending parallel.

14. An electrical distribution system as claimed in claim 10 wherein said union housing is a feed housing, said feed housing having a connecting wire secured to each of said two current-carrying conductors and said ground connector, said wires extending through a back plate of said union housing, said union housing having means to secure same over a wall electrical outlet.

15. An electrical distribution system as claimed in claim 10 wherein said union housing is provided with one or more through bores to receive one or more fasteners to secure same to a flat wall.

16. An electrical distribution system as claimed in claim 9 wherein said electrical receptacle is provided with a pair of foot plates extending from a bottom wall thereof, said foot plates each having a toe extension which engage in a respective one of said undercut channels, said receptacle being slid in engagement with said track from a free end of said track and retained captive in said channels and in sliding engagement therewith.

17. An electrical distribution system as claimed in claim 9 wherein said means establishing electrical contact with said current-carrying conductors is provided by spring contact members having displaceable arms which are actuated by projecting formations formed in a rear face of a hinged top cover of said receptacle so that when said cover is closed over an open top end of a housing of said receptacle, the displaceable arms are urged toward a respective one of said two current-carrying conductors to make contact therewith, said spring contact members being in contact with selected ones of contact elements disposed in said blade receiving slots of said socket, and a ground contact element for engaging said ground conductor in said track to connect same to said ground slot of said receptacle.

18. An electrical distribution system as claimed in claim 17 wherein said receptacle is provided with a socket in a top face of said hinged cover and in an end wall of said receptacle housing.

19. An electrical distribution system as claimed in claim 17 wherein said hinged cover is positively retained in a closed position over said open top end of said housing by a retention catch to prevent said hinged cover from being opened.

20. An electrical distribution system as claimed in claim 9 wherein a surge protection device is removably secured to said electrical receptacles to protect an electrical device connected to said electrical receptacles from voltage surges present on said current-carrying conductors.

21. An electrical distribution system as claimed in claim 20, wherein said surge protection device is removably connected to a socket in an end wall of one of said receptacles said surge protection device having visual indicating means to indicate its condition.

22. An electrical distribution system as claimed in claim 21 wherein said electrical connector housing is a feeder housing for connection to a socket of a wall electrical outlet receptacle, said feeder housing having a flat rear wall section with a pair of contact blades and a grounding prong protruding therefrom to connect to said electrical socket of said electrical outlet receptacle, a predetermined one of said contact blades connecting to a hot slot of said electrical socket and the other blade connecting to a neutral slot of said electrical socket while said grounding prong is received in a ground slot of said electrical socket, said feeder housing having said connecting slot at at least one free end thereof for positioning adjacent an edge of said electrical outlet receptacle.

23. An electrical distribution system as claimed in claim 22 wherein said flat rear wall section of said feeder housing has a recessed section to receive a portion of a face plate of said electrical outlet receptacle in close mating contact therewith, said feeder housing having a thicket connecting section adjacent an end section thereof, said connecting slot being formed in an end wall of said thicker connecting section.

24. An electrical distribution system as claimed in claim 22 wherein said pair of contact blades and grounding prong protruding from a rear wall of said feeder housing are connected to a connector block which is removably secured over a front face of said feeder housing, said connector block maintaining the proper polarity of current fed to said two current-carrying conductors.

25. An electrical distribution system as claimed in claim 24 wherein said feeder housing is provided in said front face with a pair of spaced apart contact blade receiving apertures disposed in side-by-side alignment, and a grounding prong receiving aperture disposed between said contact blade receiving apertures and spaced therefrom on a respective one of opposed sides thereof.

26. An electrical distribution system as claimed in claim 25 wherein said pair of electrical side contacts each have a pair of blade contact terminals positioned in said housing at predetermined locations relative to said contact blade receiving apertures so that one of said terminals is in contact with a respective one of an inner terminal end of said pair of contact blades when said grounding prong of said connector block is disposed in either of said grounding prong receiving apertures in said feeder housing.

27. An electrical distribution system as claimed in claim 26 wherein said contact blades each have a U-shape connecting end held securely in said connector block with said contact blades extending out of an inner face of said block, said U-shape connecting end having a short inner blade end portion extending parallel and spaced from said contact blade by an intermediate transverse blade section, said short inner blade end portion also extending out of said inner face of said block and constituting said inner terminal ends, one of said intermediate transverse blade sections of said pair of contact blades being of a different length.

28. An electrical distribution system as claimed in claim 27 wherein said contacting portions of said pair of blades are disposed in straight alignment with said blade receiving apertures with two contacting portions on each opposed side of said blade receiving apertures.

29. An electrical distribution system as claimed in claim 23 wherein said feeder housing is a vertical feeder housing for connection to a lower or upper socket of a double-socket electrical wall outlet receptacle and extending vertically over a top or bottom edge of a receptacle face plate.

30. An electrical distribution system as claimed in claim 23 wherein said feeder housing is a horizontal feeder housing for connection to a lower or upper socket of a double-socket electrical wall outlet receptacle and extending horizontally across vertical side edges of a receptacle face plate.

31. An electrical distribution system as claimed in claim 30 wherein said feeder housing is of rectangular shape and provided with a connecting slot in opposed end walls of said housing.

32. An electrical distribution system as claimed in claim 31 wherein said flat rear wall section is a recessed section receiving said face plate therein whereby said connecting slots are disposed in alignment with tracks secured to adjacent wall portions.

33. An electrical distribution system as claimed in claim 1 wherein said strip is an extruded strip with said two current-carrying conductors and said ground conductor being bare conductive wires embedded therein.

34. An electrical distribution system as claimed in claim 1 wherein there is further provided a power feed receptacle detachably securable to any one of said one or more electrical tracks, said power feed receptacle having a pair of contact blades and a grounding prong extending from an accessible face thereof for connection to a female connector of an electrical extension cord, means establishing electrical contact with said current-carrying conductors, and locking means to arrest said power feed receptacle at a desired location along said one of said tracks.

35. An electrical distribution system as claimed in claim 34 wherein said contact blades and said grounding prong extend from a top face of a hinged cover of a housing of said power feed receptacle.

36. An electrical distribution system as claimed in claim 35 wherein said means establishing electrical contact is provided by a pair of spring contact members each having a displaceable arm which has a side contact engaging finger which is urged to contact a respective one of said current-carrying conductors in said undercut channels, said cover having a displacement post extending from a rear face thereof and slidingly engaging said spring contact members to effectuate said displacement when said cover is hingedly closed over an open top end of said housing.

37. An electrical distribution system as claimed in claim 36 wherein said contact blades and said grounding prong have inner extension portions protruding inwardly from said cover rear face, said inner extension portions engaging a respective one of said spring contact members and said inner extension of said grounding prong engaging a ground engaging contact in said housing when said cover is closed.

38. An electrical distribution system as claimed in claim 35 wherein a spring-loaded catch is secured to said housing and positively engages said cover when closed over an open top end of said housing.

39. An electrical distribution system as claimed in claim 38 wherein said housing is provided with foot extensions protruding from a base of said housing to maintain said base spaced a predetermined distance above said top face of said strip.

40. An electrical distribution system as claimed in claim 39 wherein said foot extensions are positioned in said channels, at least two opposed ones of said foot extensions have toe extensions slidingly received in a respective one of said undercut channels.

41. A power feed receptacle for detachable securement to an electrical track, said track having two-current-carrying conductors each retained in an undercut channel and a ground conductor retained in a top face of said track intermediate and parallel to said current-carrying conductors, said receptacle having a pair of contact blades and a grounding prong extending from an accessible face thereof for connection to a female connector of an electrical extension cord, means establishing electrical contact with said current-carrying conductors, and locking means to arrest said power feed receptacle at a desired location along said track.

42. A power feed receptacle for detachable securement to an electrical track as claimed in claim 41 wherein said contact blades and said grounding prong extend from a top face of a hinged cover of a housing of said power feed receptacle.

43. A power feed receptacle for detachable securement to an electrical track as claimed in claim 42 wherein said means establishing electrical contact is provided by a pair of spring contact members each having a displaceable arm which has a side contact engaging finger which is urged to contact a respective one of said current-carrying conductors in said undercut channels, said cover having a displacement post formed and extending from a rear face thereof and slidingly engaging said spring contact members to effectuate said displacement when said cover is hingedly closed over an open top end of said housing.

44. A power feed receptacle for detachable securement to an electrical track as claimed in claim 43 wherein said contact blades and said grounding prong have inner extension portions protruding inwardly from said cover rear face, said inner extension portions engaging a respective one of said spring contact members and said inner extension of said grounding prong engaging a ground engaging contact in said housing when said cover is closed.

45. A power feed receptacle for detachable securement to an electrical track as claimed in claim 42 a spring-loaded catch is secured to said housing and positively engages said cover when closed over an open top end of said housing.

46. A power feed receptacle for detachable securement to an electrical track as claimed in claim 45 wherein said housing is provided with foot extensions protruding from a base of said housing to maintain said base spaced a predetermined distance above said top face of said strip.

47. A power feed receptacle for detachable securement to an electrical track as claimed in claim 46 wherein said foot extensions are positioned in said channels, at least two opposed ones of said foot extensions have toe extensions slidingly received in a respective one of said undercut channels.

48. An electrical feed housing for connection to an electrical socket of an electrical receptacle and capable of maintaining the phase of the current in a pair of conductors secured to said feed housing regardless if said socket is inverted, said feed housing having a pair of blade receiving through slots and a ground prong receiving through slot intermediate said blade receiving through slots and disposed on a respective side thereof, said feed housing further having a connector block, said connector block having a pair of contact blades and a grounding prong for removable connection to said socket of said feed housing, said contact blades and grounding prong of said connector block extending through said feed housing and projecting from a rear wall of said housing to engage within the electrical socket of the electrical receptacle, said connector block having contact terminal means to engage with two conductor means in said feed housing to connect a hot slot of said electrical socket to one of said two conductor means and the neutral slot of said electrical socket to the other of said two conductor means, regardless if said socket of said electrical receptacle is inverted.

49. An electrical feed housing as claimed in claim 48 wherein said pair of conductors are secured in an electrical track which also comprises a ground conductor, said track having an end portion secured in a connecting slot of said housing, said two conductor means having a contact element extending in said slot and contacting a respective conductor in said pair of conductors.

50. An electrical feed housing as claimed in claim 49 wherein said feeder housing has a flat recessed rear wall section to receive a portion of a face plate of an electrical outlet receptacle in close mating contact and flush therewith, said feeder housing having a thicker connecting section adjacent an end section thereof, said connecting slot being formed in an end wall of said thicker connecting section.

51. An electrical feed housing as claimed in claim 48 wherein said contact blades each have a U-shape connecting end held securely in said connector block with said contact blades extending out of an inner face of said block, said U-shape connecting end having a short inner blade end portion extending parallel and spaced from said contact blade by an intermediate transverse blade section, said short inner blade end portion constituting said contact terminal means and extending out of said inner face of said block, one of said intermediate transverse blade sections of said pair of contact blades being of a different length.

52. An electrical feed housing as claimed in claim 51 wherein said contacting portions of said pair of blades are disposed in straight alignment with said blade receiving apertures with two contacting portions on each opposed side of said blade receiving apertures.

* * * * *